(12) United States Patent
Yokote et al.

(10) Patent No.: US 10,118,502 B2
(45) Date of Patent: Nov. 6, 2018

(54) TEMPERATURE CONDITIONING UNIT, TEMPERATURE CONDITIONING SYSTEM, AND VEHICLE PROVIDED WITH TEMPERATURE CONDITIONING UNIT

(71) Applicant: Panasonic Intellectual Property Management Co., Ltd., Osaka (JP)

(72) Inventors: Shizuka Yokote, Osaka (JP); Michihiro Kurokawa, Osaka (JP); Masahito Hidaka, Osaka (JP); Koji Kuyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/308,401

(22) PCT Filed: Jun. 4, 2015

(86) PCT No.: PCT/JP2015/002826
§ 371 (c)(1),
(2) Date: Nov. 2, 2016

(87) PCT Pub. No.: WO2015/190077
PCT Pub. Date: Dec. 17, 2015

(65) Prior Publication Data
US 2017/0096079 A1    Apr. 6, 2017

(30) Foreign Application Priority Data
Jun. 11, 2014    (JP) .................................. 2014-120171

(51) Int. Cl.
*B60K 11/06* (2006.01)
*B60L 11/18* (2006.01)
(Continued)

(52) U.S. Cl.
CPC ...... *B60L 11/1874* (2013.01); *B60H 1/00471* (2013.01); *B60K 1/00* (2013.01);
(Continued)

(58) Field of Classification Search
CPC ..... B60K 2001/003; B60K 1/04; F04D 29/30; F04D 29/324; F04D 29/38; F04D 29/242
(Continued)

(56) References Cited

U.S. PATENT DOCUMENTS 5,588,178 A * 12/1996 Liu ........................... A47L 5/14
15/330
6,220,819 B1 * 4/2001 Chien ................. F04D 29/2222
416/186 R
(Continued)

FOREIGN PATENT DOCUMENTS

| | | |
|---|---|---|
| CN | 101253333 A | 8/2008 |
| JP | 2013-104365 | 5/2013 |

OTHER PUBLICATIONS

International Search Report of PCT application No. PCT/JP2015/002826 dated Sep. 8, 2015.
(Continued)

*Primary Examiner* — Jeffrey J Restifo
(74) *Attorney, Agent, or Firm* — McDermott Will & Emery LLP

(57) ABSTRACT

Temperature conditioning unit according to the present invention includes: impeller, electric motor, fan case, and housing. Impeller includes impeller disk and a plurality of rotor blades. The plurality of rotor blades extends in a direction along rotary shaft. Each of the plurality of rotor blades has a cross-sectional circular-arc shape, in a direction intersecting rotary shaft, which is a convex form curving outward toward a direction of rotation of impeller disk. Each of the plurality of rotor blades includes an inner-periphery-
(Continued)

side edge located on the rotary shaft side, and an outer-periphery-side edge located on the opposite rotary-shaft side. Housing includes external surface on which fan case is mounted. In the inside of housing, a member to be temperature conditioned is accommodated.

19 Claims, 22 Drawing Sheets

(51) Int. Cl.
*F04D 29/30* (2006.01)
*H01M 10/6563* (2014.01)
*H01M 10/625* (2014.01)
*H01M 10/663* (2014.01)
*B60K 1/00* (2006.01)
*F04D 29/28* (2006.01)
*F04D 29/44* (2006.01)
*B60H 1/00* (2006.01)
*F04D 29/42* (2006.01)

(52) U.S. Cl.
CPC .......... *F04D 29/281* (2013.01); *F04D 29/30* (2013.01); *F04D 29/4253* (2013.01); *F04D 29/441* (2013.01); *F04D 29/444* (2013.01); *H01M 10/625* (2015.04); *H01M 10/6563* (2015.04); *H01M 10/663* (2015.04); *B60K 2001/005* (2013.01); *B60Y 2200/91* (2013.01); *B60Y 2200/92* (2013.01); *B60Y 2306/05* (2013.01); *H01M 2220/00* (2013.01); *H01M 2220/20* (2013.01)

(58) Field of Classification Search
USPC .......... 416/235, 236 A; 180/68.5, 68.1, 68.2
See application file for complete search history.

(56) References Cited

U.S. PATENT DOCUMENTS

| | | | | |
|---|---|---|---|---|
| 6,514,036 B2* | 2/2003 | Marshall | ............... | E01H 1/0809 |
| | | | | 415/102 |
| 6,537,030 B1* | 3/2003 | Garrison | ............... | F04D 29/282 |
| | | | | 416/185 |
| 6,551,058 B2* | 4/2003 | Nowack | ............... | F04D 29/2261 |
| | | | | 415/131 |
| 6,871,697 B2* | 3/2005 | Albright | ............... | E02F 9/0883 |
| | | | | 123/41.49 |
| 6,922,925 B2* | 8/2005 | Watanabe | ............... | E02F 3/325 |
| | | | | 123/41.49 |
| 7,045,235 B2* | 5/2006 | Arthur | ............... | H01M 8/04007 |
| | | | | 429/434 |
| 7,061,208 B2* | 6/2006 | Nishihata | ........... | G05D 23/1919 |
| | | | | 320/150 |
| 7,112,043 B2* | 9/2006 | Jarrah | ............... | F01D 5/048 |
| | | | | 416/183 |
| 7,230,404 B2* | 6/2007 | Kimoto | ............... | H01M 2/1077 |
| | | | | 320/150 |
| 7,631,711 B2* | 12/2009 | Kubo | ............... | B60K 1/04 |
| | | | | 180/65.1 |
| 7,794,206 B2* | 9/2010 | Keber | ............... | F04D 29/023 |
| | | | | 416/186 R |
| 7,828,520 B2* | 11/2010 | Lin | ............... | H01L 23/467 |
| | | | | 415/192 |
| 8,007,232 B2* | 8/2011 | Hwang | ............... | F04D 29/281 |
| | | | | 415/182.1 |
| 8,029,251 B2* | 10/2011 | Oguma | ............... | F04D 29/263 |
| | | | | 415/219.1 |
| 8,051,578 B2* | 11/2011 | Kohlrusch | ............... | D06F 58/20 |
| | | | | 264/310 |
| 8,075,276 B2* | 12/2011 | Hwang | ............... | F04D 29/023 |
| | | | | 416/229 R |
| 8,079,816 B2* | 12/2011 | Huang | ............... | F04D 29/38 |
| | | | | 416/135 |
| 8,092,185 B2* | 1/2012 | Hwang | ............... | F04D 29/281 |
| | | | | 415/203 |
| 8,100,664 B2* | 1/2012 | Hwang | ............... | F04D 29/30 |
| | | | | 416/236 R |
| 8,113,802 B2* | 2/2012 | Liang | ............... | F04D 29/2233 |
| | | | | 29/888.024 |
| 8,202,055 B2* | 6/2012 | Wu | ............... | F04D 29/281 |
| | | | | 416/210 R |
| 8,215,918 B2* | 7/2012 | Hwang | ............... | F04D 29/281 |
| | | | | 416/231 B |
| 8,292,588 B2* | 10/2012 | Otsuki | ............... | F04D 25/0613 |
| | | | | 415/206 |
| 8,317,478 B2* | 11/2012 | Higo | ............... | F04D 29/325 |
| | | | | 264/336 |
| 8,684,117 B2* | 4/2014 | Ptacek | ............... | F01P 1/06 |
| | | | | 165/101 |
| 8,974,194 B2* | 3/2015 | Yin | ............... | F04D 25/0653 |
| | | | | 417/420 |
| 8,978,803 B2* | 3/2015 | Foos | ............... | B60H 1/00278 |
| | | | | 180/68.1 |
| 9,004,868 B2* | 4/2015 | Rhodes | ............... | F04D 29/281 |
| | | | | 29/889.4 |
| 9,022,751 B2* | 5/2015 | Zheng | ............... | F04D 17/04 |
| | | | | 417/420 |
| 9,039,362 B2* | 5/2015 | Fukuda | ............... | F04D 25/0613 |
| | | | | 415/206 |
| 9,222,482 B2* | 12/2015 | Huang | ............... | F04D 29/281 |
| 9,261,107 B2* | 2/2016 | Kim | ............... | F04D 29/30 |
| 9,267,507 B2* | 2/2016 | Wu | ............... | F04D 25/0613 |
| 9,416,793 B2* | 8/2016 | Chiou | ............... | F04D 17/16 |
| 9,541,098 B2* | 1/2017 | Duquette | ............... | F04D 29/30 |
| 9,566,859 B2* | 2/2017 | Hatta | ............... | B60K 11/06 |
| 9,616,736 B2* | 4/2017 | Ito | ............... | B60K 17/043 |
| 9,651,057 B2* | 5/2017 | Lyons | ............... | F04D 29/30 |
| 9,660,309 B2* | 5/2017 | Cho | ............... | H01M 10/63 |
| 9,709,073 B2* | 7/2017 | Otsuka | ............... | F04D 29/666 |
| 9,745,996 B2* | 8/2017 | Nurzynski | ............... | F04D 29/384 |
| 9,765,788 B2* | 9/2017 | Dybenko | ............... | F04D 25/0613 |
| 9,777,742 B2* | 10/2017 | Yang | ............... | F04D 29/281 |
| 9,777,743 B2* | 10/2017 | Yang | ............... | F04D 29/281 |
| 9,810,239 B2* | 11/2017 | Hayamitsu | ............... | A47L 5/22 |
| 9,890,797 B2* | 2/2018 | Wilfley | ............... | F04D 29/622 |
| 9,899,712 B2* | 2/2018 | Nagano | ............... | H01M 10/613 |
| 9,903,385 B2* | 2/2018 | Kawanishi | ............... | F04D 29/28 |
| 2009/0255654 A1 | 10/2009 | Zheng et al. | | |

OTHER PUBLICATIONS

English Translation of Chinese Search Report dated Jul. 26, 2018 for the related Chinese Patent Application No. 201580029520.8.

* cited by examiner

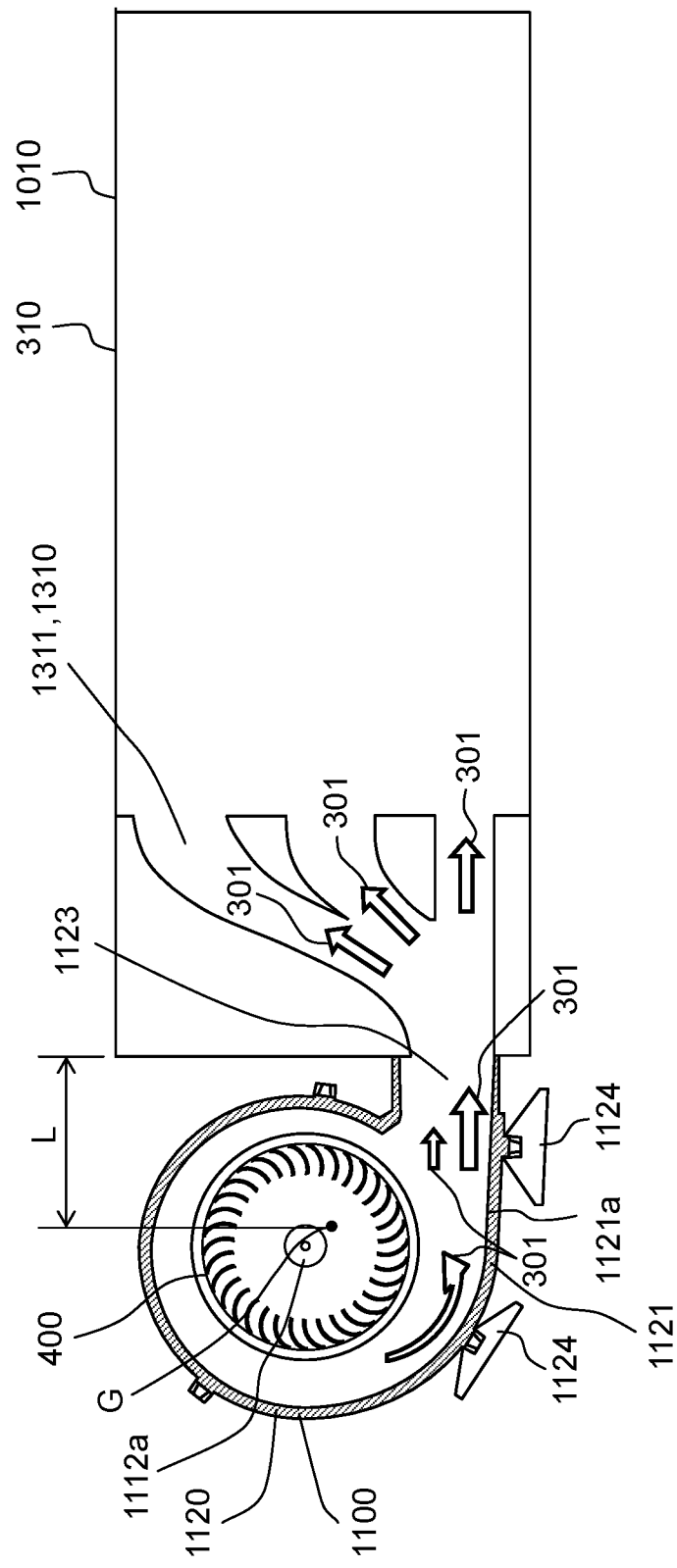

Forward fan

Backward fan

TEMPERATURE CONDITIONING UNIT, TEMPERATURE CONDITIONING SYSTEM, AND VEHICLE PROVIDED WITH TEMPERATURE CONDITIONING UNIT

This application is a U.S. national stage application of the PCT international application No. PCT/JP2015/002826 filed on Jun. 4, 2015, which claims the benefit of foreign priority of Japanese patent application No. 2014-120171 filed on Jun. 11, 2014, the contents all of which are incorporated herein by reference.

TECHNICAL FIELD

The present invention relates to temperature conditioning units for conditioning temperatures of members to-be-conditioned, and to temperature conditioning systems equipped with the temperature conditioning units. In particular, the present invention relates to a temperature conditioning unit and a temperature conditioning system which are used to condition temperatures of a power storage device, an inverter device, and the like that are mounted in a vehicle such as an electric vehicle and a hybrid vehicle.

BACKGROUND ART

Conventionally, such vehicles as hybrid vehicles have been known to be provided with a plurality of power sources. As one of the vehicles equipped with a plurality of power sources, a vehicle having a secondary battery has been known. In the vehicle equipped with the secondary battery, cells configuring the secondary battery generate heat upon charging and discharging of the battery.

That is, the cells included in the secondary battery have internal resistance in the insides of the cells. Moreover, when the cells included in the secondary battery are connected to one another, it causes contact resistance at connected portions of the cells. Electric currents are passed through the cells having these electrical resistive components, for charging or discharging the cells. When an electric current is passed through each of the cells having the electrical resistive components, the cell generates heat.

By the way, lifetime of the secondary battery is greatly influenced by temperatures. Against such a temperature problem of the secondary battery, the following countermeasures are considered, for example. That is, in normal operation, the cells included in the secondary battery require that airflow be maintained in a predetermined air volume in order to suppress a temperature rise in the cells. Moreover, in operation at very low temperatures, the cells included in the secondary battery require that they be heated in a predetermined quantity of heat in order to exhibit their ability required.

Taking these countermeasures against the temperature problem makes it possible to compute an available power-supply capacity of the secondary battery. In other words, a power supply system using the secondary battery can be improved in capacity of its available power-output, in accordance with what the countermeasures against the temperature problem are. Moreover, the power supply system using the secondary battery can be reduced in the number of the cells that are required for the secondary battery, in accordance with what the countermeasures against the temperature problem are. This means that such countermeasures against the temperature problem are greatly important for the secondary battery.

On the other hand, a vehicle, a means of traveling, has only a limited space to be utilized. In general, in the vehicle using the secondary battery, higher priorities are given to comfort of the passenger cabin, traveling performance of the vehicle, and the like. Accordingly, in the vehicle using the secondary battery, it is difficult to allocate a space large enough to mount the secondary battery. For this reason, in the vehicle using the secondary battery, the vehicle is equipped with the secondary battery the amount of which is restricted because of such an insufficiently allocated space for their mounting.

In the vehicle using the secondary battery, an air-cooling means is commonly adopted to forcibly cool the secondary battery. In the vehicle using the secondary battery, the air-cooling means is used to condition temperature of the secondary battery. A temperature conditioning unit and the like cools the secondary battery, i.e. a member to be temperature-conditioned. As a matter of course, when the output-power density, i.e. energy can be output from the secondary battery on a unit mass basis, becomes higher, it requires a higher output power of the temperature conditioning unit.

Unfortunately, when it is tried to increase the output power of the temperature conditioning unit and the like, it tends to increase the size of the temperature conditioning unit and the like. On the other hand, the members to be mounted in the vehicle are required to be compact, as described above.

In this way, in the vehicle using the secondary battery, compatibility between the following two demands has been required. That is, one of the demands is for a higher output of the temperature conditioning unit and the like, leading to a factor for an increase in size. The other is for downsizing of the members to be mounted in the vehicle.

CITATION LIST

Patent Literature

PTL 1: Japanese Patent Unexamined Publication No. 2013-104365

SUMMARY

A temperature conditioning unit, an object of the present invention, includes an impeller, an electric motor, a fan case, and a housing.

The impeller includes an impeller disk and a plurality of rotor blades. The impeller disk includes a rotary shaft at the center portion of the disk. The impeller disk has a surface that extends in a direction intersecting the rotary shaft. The plurality of the rotor blades extends in the direction along the rotary shaft. Each of the plurality of the rotor blades has a cross-sectional circular-arc shape, in the direction intersecting the rotary shaft, which is a convex form curving outward toward the direction of rotation of the impeller disk. Each of the plurality of the rotor blades includes an inner-periphery-side edge located on the rotary shaft side, and an outer-periphery-side edge located on the opposite rotary-shaft side.

The electric motor includes a shaft. The motor transfers a rotary motion to the rotary shaft via the shaft.

The fan case is configured to cover the impeller. The fan case includes a side wall, a suction hole, a discharge hole, and a flow path. The side wall is formed along the rotary shaft. The suction hole is located in the direction of the shaft center that the rotary shaft contains. The discharge hole is located on the opposite side of the suction hole, with respect to the side wall, in the direction along the rotary shaft. The impeller rotates by the rotary motion transferred from the motor. Through the rotation, air having been suctioned from the suction hole into the flow path, is passed through from the inner-periphery-side edge to the outer-periphery-side edge, and is guided along the side wall to the discharge hole.

The housing includes an external surface on which the fan case is mounted. The housing accommodates a member to be temperature-conditioned, in the inside of the housing.

BRIEF DESCRIPTION OF DRAWINGS

FIG. 5 is a schematic view of a temperature conditioning unit in a Comparative Example that is compared with Examples according to the present invention.

DESCRIPTION OF PREFERRED EMBODIMENTS

A temperature conditioning unit, with a configuration to be described later, according to an embodiment of the present invention is capable of efficiently blowing air into a housing which accommodates highly populated components disposed therein. The temperature conditioning unit according to the embodiment of the invention can be implemented with a compact and simple configuration.

On the other hand, conventional temperature conditioning units have had the following problems to be improved. That is, conventional automotive air conditioners, i.e. the conventional temperature conditioning units, shown in Patent Literature 1 and the like, each adopt a centrifugal blower having a scroll casing. Such a centrifugal blower having the scroll casing requires a flow path that is formed in a predetermined straight-line shape and disposed to follow an outlet portion of the scroll casing. This results in a longer distance from the centrifugal blower to a housing, in each of the conventional automotive air conditioners. In other words, the conventional automotive air conditioner has required much space for mounting the conditioner there.

Moreover, in the conventional automotive air conditioner, airflow discharged from an impeller is biased outward toward an outer peripheral part of a side wall that configures the scroll casing. For this reason, the conventional automotive air conditioner requires a rectification mechanism, such as a shunt duct, to obtain a uniform distribution of temperatures inside the housing. The conventional automotive air conditioner has been difficult to reduce in size because of the need for the rectification mechanism. Note that the impeller is also called a centrifugal fan.

Hereinafter, embodiments of the present invention will be described with reference to the accompanying drawings. It is noted, however, that each of the following embodiments is nothing more than an example for embodying the present invention, and is in no way intended to limit the technical scope of the invention.

First Exemplary Embodiment

Figure 1A:
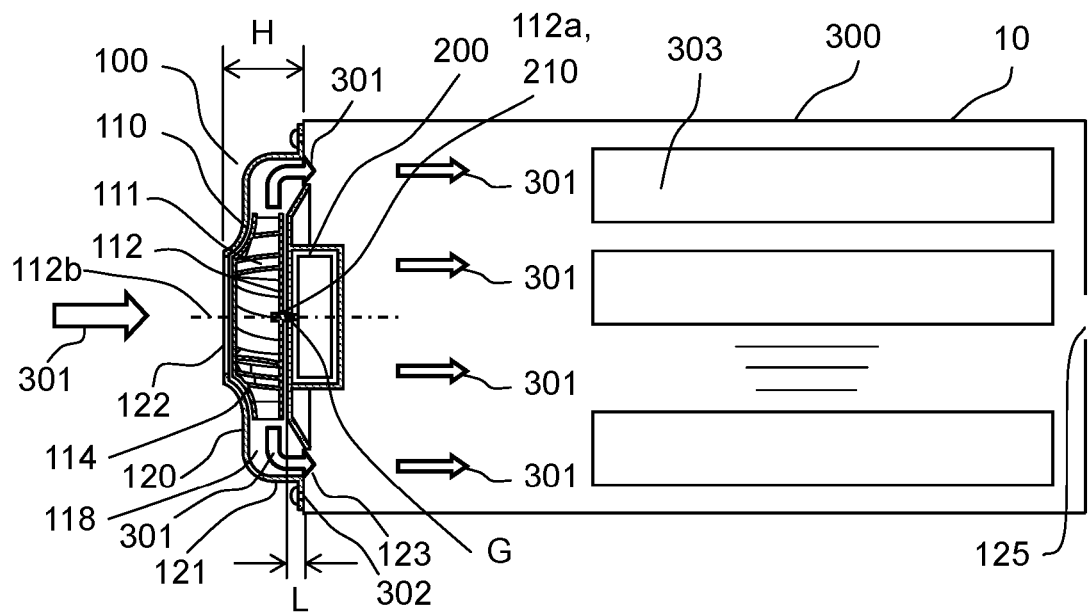
FIG. 1A is a schematic view of a temperature conditioning unit according to a first embodiment of the present invention.
Figure 1B:
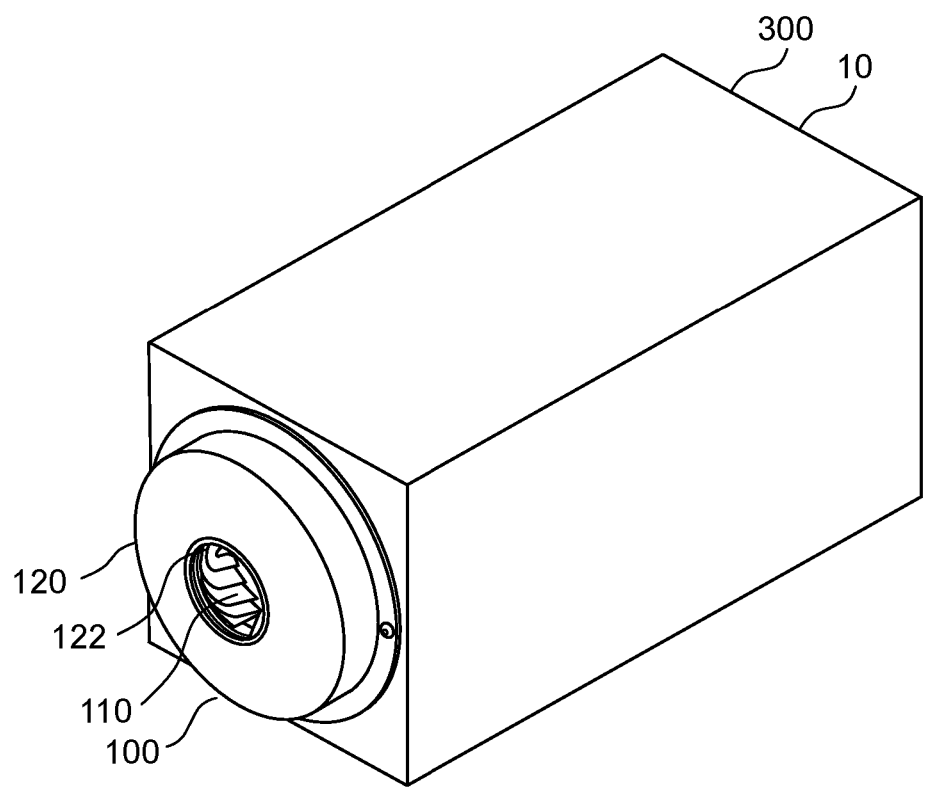
FIG. 1B is a perspective view of the temperature conditioning unit according to the first embodiment of the present invention.
Figure 1C:
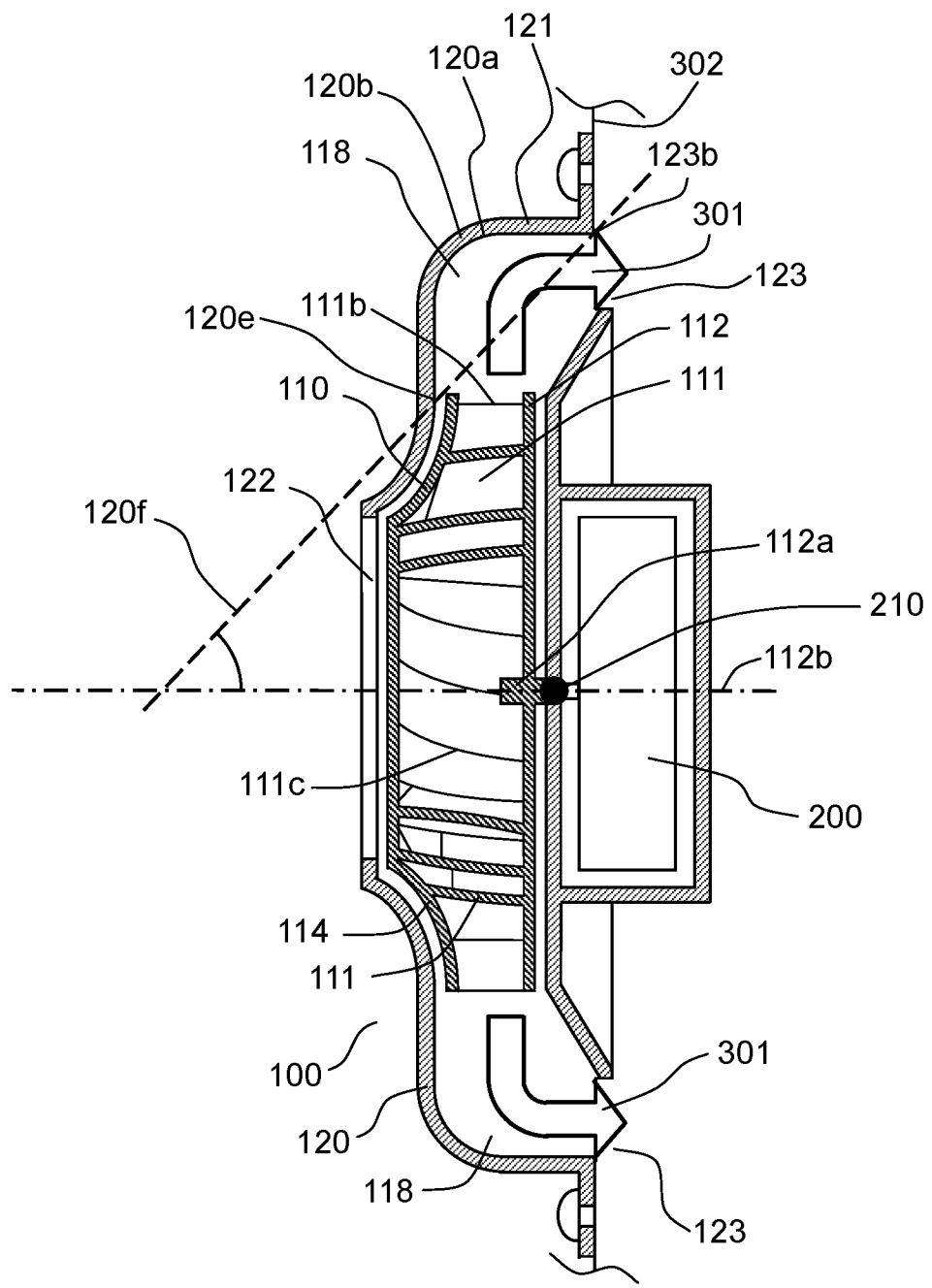
FIG. 1C is an enlarged view of a principal part of the temperature conditioning unit shown in FIG. 1A.
Figure 1D:
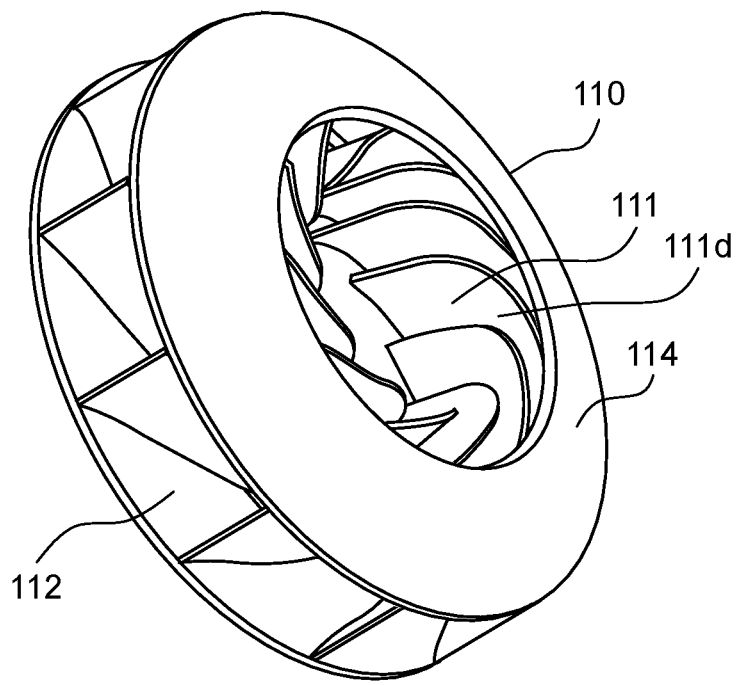
FIG. 1D is a perspective view of an impeller according to the first embodiment of the present invention.
Figure 1E:
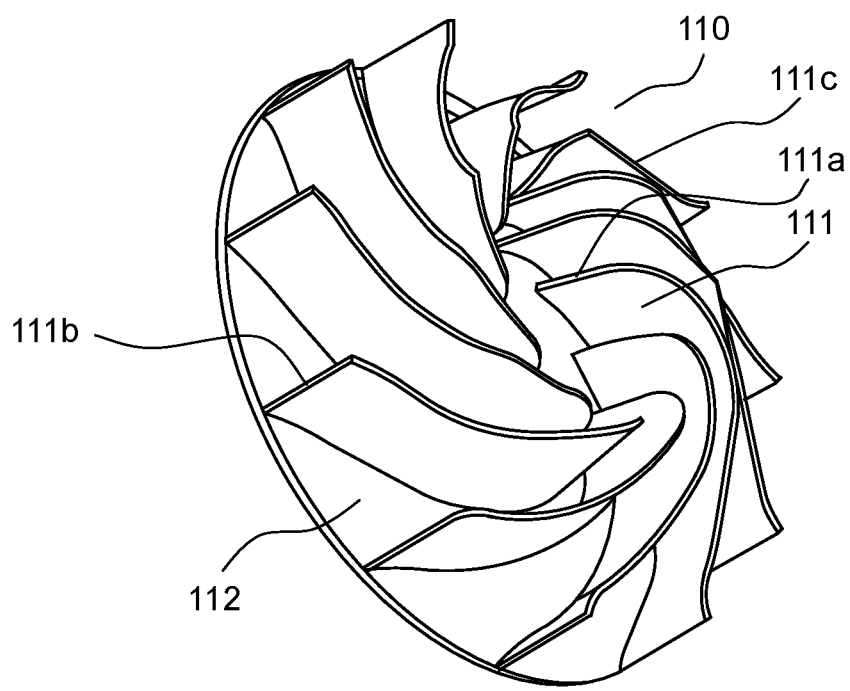
FIG. 1E is a schematic perspective view of the impeller shown in FIG. 1D in a state where a shroud has been removed from the impeller.
Figure 1F:
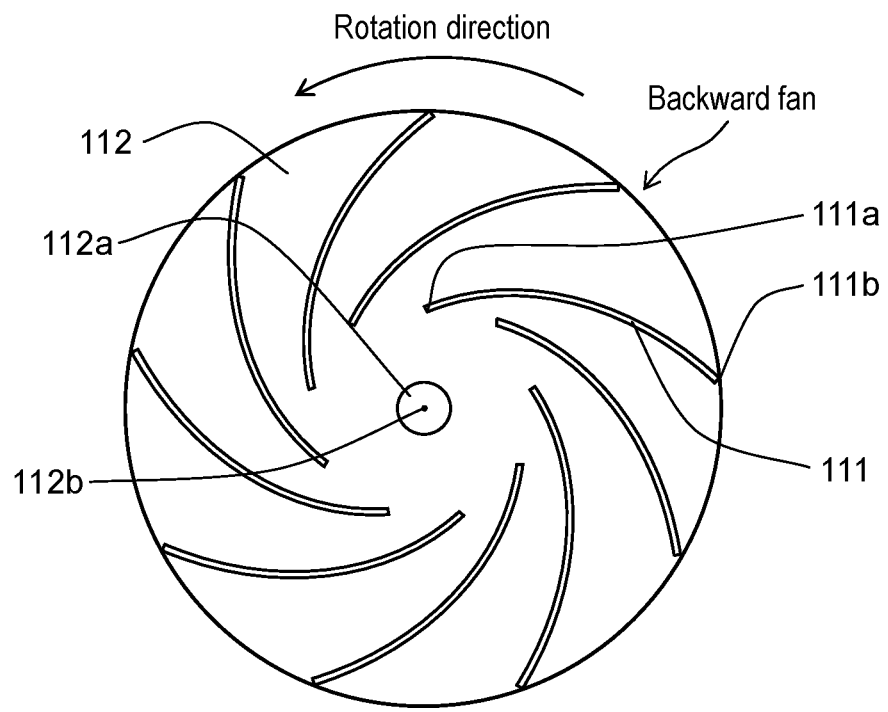
FIG. 1F is a schematic view for illustrating the impeller according to the first embodiment of the present invention.
Figure 1G:
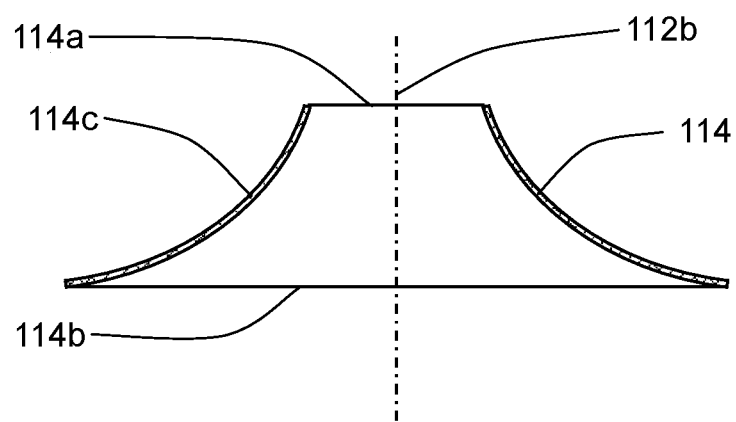
FIG. 1G is a view for illustrating the shroud which is included in the impeller shown in FIG. 1D.

FIG. 1A is a schematic view of a temperature conditioning unit according to a first embodiment of the present invention. FIG. 1B is a perspective view of the temperature conditioning unit according to the first embodiment of the invention. FIG. 1C is an enlarged view of a principal part of the temperature conditioning unit shown in FIG. 1A. FIG. 1D is a perspective view of an impeller according to the first embodiment of the invention. FIG. 1E is a schematic perspective view of the impeller shown in FIG. 1D in a state where a shroud has been removed from the impeller. FIG. 1F is a schematic view for illustrating the impeller according to the first embodiment of the invention. FIG. 1G is a view for illustrating the shroud which is included in the impeller shown in FIG. 1D.

Figure 2:
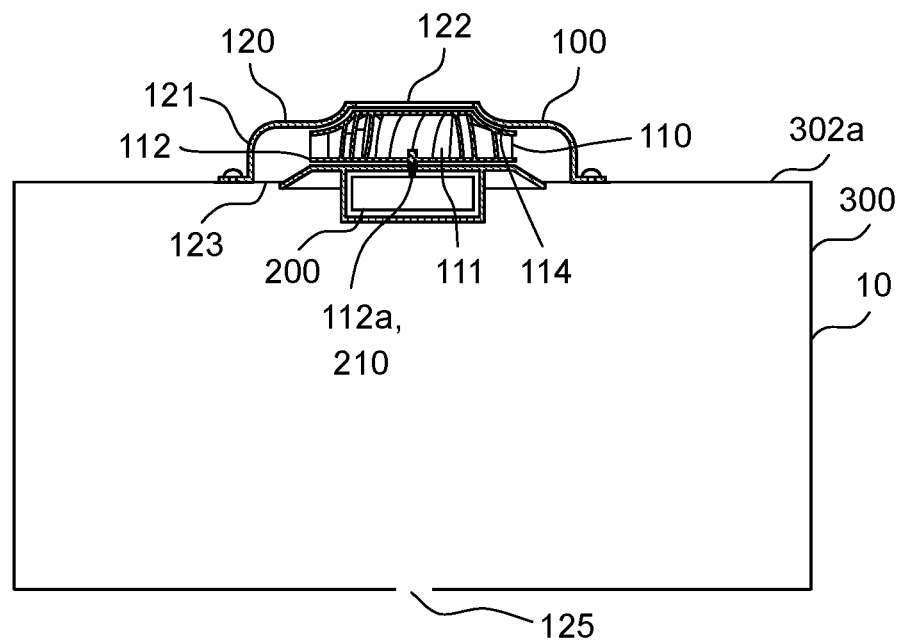
FIG. 2 is a schematic view of another configuration of the temperature conditioning unit according to the first embodiment of the present invention.
Figure 3:
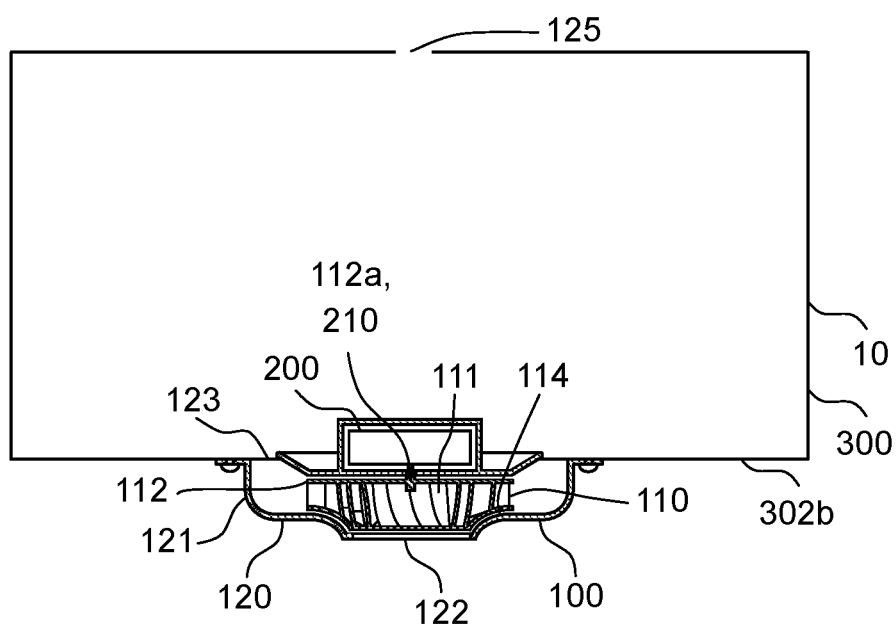
FIG. 3 is a schematic view of further another configuration of the temperature conditioning unit according to the first embodiment of the present invention.
Figure 4:
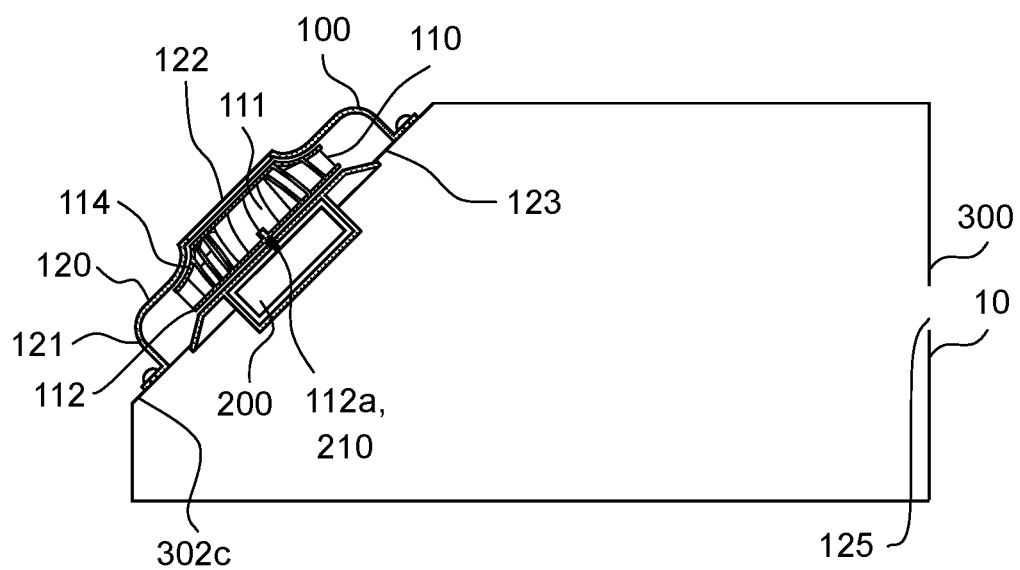
FIG. 4 is a schematic view of still another configuration of the temperature conditioning unit according to the first embodiment of the present invention.

FIG. 2 is a schematic view of another configuration of the temperature conditioning unit according to the first embodiment of the present invention. FIG. 3 is a schematic view of further another configuration of the temperature conditioning unit according to the first embodiment of the invention. FIG. 4 is a schematic view of still another configuration of the temperature conditioning unit according to the first embodiment of the invention.

FIG. 5 is a schematic view of a temperature conditioning unit in a Comparative Example that is compared with Examples according to the present invention.

As shown in FIGS. 1A and 1B, temperature conditioning unit 10 according to the embodiment of the present invention includes impeller 110, electric motor 200, fan case 120, and housing 300.

As shown in FIGS. 1D and 1E, impeller 110 includes impeller disk 112 and a plurality of rotor blades 111.

As shown in FIGS. 1C and 1F, impeller disk 112 includes rotary shaft 112a at the center portion of the disk. Impeller disk 112 has a surface that extends in a direction intersecting rotary shaft 112a. The plurality of rotor blades 111 extends in the direction along rotary shaft 112a. As shown in FIG. 1F, each of the plurality of rotor blades 111 has a cross-sectional circular-arc shape, in a direction intersecting rotary shaft 112a, which is a convex form curving outward toward the direction of rotation of impeller disk 112. Each of the plurality of rotor blades 111 includes inner-periphery-side edge 111a located on the rotary shaft 112a side, and outer-periphery-side edge 111b located on the opposite rotary-shaft side.

As shown in FIGS. 1A and 1C, electric motor 200 includes shaft 210. Motor 200 transfers a rotary motion to rotary shaft 112a via shaft 210.

Fan case 120 is configured to cover impeller 110. Fan case 120 includes side wall 121, suction hole 122, discharge hole 123, and flow path 118. Side wall 121 is formed along rotary shaft 112a. Suction hole 122 is located in the direction of shaft center 112b that rotary shaft 112a contains. Discharge hole 123 is located on the opposite side of suction hole 122, with respect to side wall 121, in the direction along rotary shaft 112a. Impeller 110 rotates by the rotary motion transferred from motor 200. Through the rotation of the impeller, air is suctioned from suction hole 122 into flow path 118, passed through from inner-periphery-side edge 111a to outer-periphery-side edge 111b, and guided along side wall 121 to discharge hole 123.

Note that, in FIGS. 1A and 1C, flows of air are indicated by the arrows designated by numeral 301. Airflow 301 is a schematic illustration of the air flowing in the inside of temperature conditioning unit 10.

Housing 300 includes external surface 302 on which fan case 120 is mounted. Housing 300 accommodates, in the inside thereof, secondary battery 303 which is a member to be temperature-conditioned.

In particular, modes capable of offering outstanding functional effects are as follows.

That is, as shown in FIG. 1A, housing 300 further includes exhaust hole 125 that exhausts the air from housing 300 to the outside, with the air having been introduced into housing 300.

Moreover, as shown in FIG. 1C, fan case 120 further includes inner wall surface 120a that configures a part of flow path 118 and faces impeller 110.

Inner wall surface 120a includes curved part 120b. Curved part 120b is curved such that extension line 120f intersects shaft center 112b at an acute angle. The extension line extends from a straight line that connects two points of the fan case in a plane containing shaft center 112b; one of the two is close part 120e close to outer-periphery-side edge 111b; and the other is edge part 123b of discharge hole 123. Note that it is only required for curved part 120b to have a wall surface that can guide air gently and smoothly to discharge hole 123, with the air having been discharged in the direction intersecting shaft center 112b. Curved part 120b preferably has a concave form curving in the direction from fan case 120 toward the position where impeller 110 is located, in the plane containing shaft center 112b. In other words, curved part 120b preferably has a convex form curving in the direction from impeller 110 toward the position where fan case 120 is located, in the plane containing shaft center 112b. Curved part 120b is formed such that inner wall surface 120a is a smooth curved surface, with projections on and depressions in the surface having been reduced. Curved part 120b having such a smoothly-curved surface allows the suppression of occurrence of a turbulent flow, a volute flow, etc. in airflow 301 discharged from the impeller.

Moreover, fan case 120 is mounted on housing 300 such that discharge hole 123 is located in the extended plane of external surface 302.

Moreover, as shown in FIG. 1D, impeller 110 further includes shroud 114. Shroud 114 is located on the opposite side of impeller disk 112 with respect to the plurality of rotor blades 111. As shown in FIGS. 1D and 1E, shroud 114 is coupled with opposite impeller-disk-side edge 111c that is included in each of the plurality of rotor blades 111.

In shroud 114, opening 111d is formed at a position facing the suction hole (122). In the direction along the rotary shaft (112a), a distance between shroud 114 and impeller disk 112 is shorter on the outer-periphery-side edge 111b side than on the inner-periphery-side edge 111a side.

In particular, secondary battery 303, which is the member to be temperature-conditioned, includes an automotive secondary battery.

More details will be described with reference to the drawings.

As shown in FIGS. 1A to 1C, centrifugal blower 100 includes impeller 110 and fan case 120.

In impeller 110, the plurality of rotor blades 111 is formed on impeller disk 112 which has a substantially disk-like shape. Fan case 120 includes side wall 121 and suction hole 122. Side wall 121 is a wall having a substantially cylinder-like shape that extends in the direction of shaft center 112b of rotary shaft 112a which impeller 110 includes. Suction hole 122 is located in the direction of shaft center 112b. Suction hole 122 is formed in a circular-opening shape, which is centered about shaft center 112b, in the plane intersecting the direction of shaft center 112b.

Impeller 110 is coupled with electric motor 200, serving as a rotary drive source, via shaft 210.

Note that, as shown in FIGS. 2, 3, and 4, centrifugal blower 100 can also be rigidly disposed on upper surface 302a, lower surface 302b, or inclined surface 302c and the like of housing 300.

Upon rotation of motor 200 serving as the rotary drive source, impeller 110 is rotated via shaft 210. Upon rotation of impeller 110, air flows in from suction hole 122 that is formed in fan case 120. The air having flowed in from suction hole 122 is given energy via rotor blades 111. The air having the energy given from rotor blades 111 is discharged along impeller disk 112, in the direction substantially orthogonal to rotary shaft 112a.

The direction of flowing of the air having been discharged from impeller 110 is changed, along inner wall surface 120a of fan case 120, into the direction toward discharge hole 123. It is noted, however, that inner wall surface 120a of fan case 120 is preferably a gently and smoothly curved surface so as not to hinder airflow 301 from flowing.

The air having been discharged from discharge hole 123 of fan case 120 is supplied to the inside of housing 300, as a substantially uniform stream of airflow 301. Airflow 301 supplied to the inside of housing 300 either cools or heats secondary battery 303, i.e. a subject to be temperature-conditioned, which is accommodated in housing 300.

After having cooled or heated secondary battery 303, i.e. the subject to be temperature-conditioned, the air is exhausted from exhaust hole 125 that is disposed in housing 300. Exhaust hole 125 is either one or a plurality of openings that is disposed at appropriate positions of housing 300.

Moreover, suction hole 122 and exhaust hole 125 may be additionally equipped with air filters for dust proofing. In addition, suction hole 122 and exhaust hole 125 may be equipped with dehumidifiers.

Next, as shown in FIG. 1E, impeller 110 includes impeller disk 112 and the plurality of rotor blades 111. Impeller disk 112 is formed in a substantially disk-like shape, in a plane orthogonal to the rotary shaft (112a). Rotary shaft (112a) is coupled with the shaft (210) of the motor (200) serving as the rotary drive source. The plurality of rotor blades 111 is formed on the surface on one side of impeller disk 112, with the surface being located on the suction hole (122) side.

In particular, as shown in FIG. 1D, impeller 110 according to the first embodiment includes shroud 114. Shroud 114 is mounted to cover, on the suction hole (122) side, the opposite impeller-disk-side edge (111c) which is included in each of the plurality of rotor blades 111. Shroud 114 is a ring-shaped plate.

As shown in FIG. 1G, shroud 114 has a funnel-like or tapered shape.

In more detail, shroud 114 has two openings in the direction of shaft center 112b of the rotary shaft (112a). Opening 114a located on the suction hole (122) side is smaller in size than opening 114b located on the impeller disk (112) side.

Opening 114a and opening 114b are coupled with each other by side surface 114c. In the first embodiment, side surface 114c is curved such that its shape in a cross section including shaft center 112b is curved to be convex in the direction toward shaft center 112b. Besides this, in order to achieve desired performance, side surface 114c may have a straight line shape in a cross section including shaft center 112b.

1. Comparison with Comparative Example

Here, the temperature conditioning unit according to the first embodiment is compared with a temperature conditioning unit of a Comparative Example shown in FIG. 5. Temperature conditioning unit 1010 of the Comparative Example includes scroll casing 1120 which is used in conventional automotive air conditioners as well.

In the inside of scroll casing 1120, forward fan 400 is mounted. Forward fan 400 is also called a sirocco fan. Forward fan 400 operates in such a manner that air having been suctioned from the front toward the back of FIG. 5 is discharged toward a circumferential direction of forward fan 400. Airflow 301 having been discharged from forward fan 400 flows along side wall 1121 of scroll casing 1120 to reach discharge hole 1123.

More details will be described.

In the inside of scroll casing 1120 shown as the Comparative Example, the air discharged from forward fan 400 is integrated and accumulated along the circumferential direction. In scroll casing 1120, a distance of side wall 1121 from rotary shaft 1112a gradually becomes larger at greater circumferential distances. With this configuration, airflow 301 having been discharged from forward fan 400 is biased outward toward outer periphery surface 1121a of side wall 1121. For this reason, in order to make airflow 301 supplied into housing 310 uniform, rectification mechanism 1310 such as duct 1311 has been necessary which is set in the inside of housing 310.

Moreover, in centrifugal blower 1100 using forward fan 400, distance "L" from center-of-gravity G of centrifugal blower 1100 to discharge hole 1123 is long. Accordingly, the mounting of centrifugal blower 1100 to housing 310 causes temperature conditioning unit 1010 to get out of balance, leading to an unstable state. Thus, centrifugal blower 1100 is sometimes rigidly mounted to a neighboring member via mounting part 1124. In this case, mounting part 1124 has been required to undergo different modifications in shape so as to adapt to different usage environments in each of which temperature conditioning unit 1010 is used.

In particular, in the case where rectification mechanism 1310 is configured to be separated from housing 310, a distance from center-of-gravity G to rectification mechanism 1310 has to be taken into consideration. In general, the distance from center-of-gravity G to rectification mechanism 1310 is so long that the balance of the temperature conditioning unit becomes worse.

On the other hand, as shown in FIG. 1A, temperature conditioning unit 10 according to the first embodiment can provide, to the inside of housing 300, airflow 301 being less biased, with the airflow having been discharged from centrifugal blower 100. Therefore, even without any rectification mechanism, the temperature of secondary battery 303 accommodated in housing 300 can be effectively conditioned, with the battery being the member to be temperature-conditioned. Accordingly, temperature conditioning unit 10 according to the first embodiment eliminates the need for the rectification mechanism such as a duct. That is, temperature conditioning unit 10 according to the first embodiment can reduce a pressure loss and a friction loss in airflow 310, with these losses having been caused by the rectification mechanism mounted in the conventional temperature conditioning unit. As a result, temperature conditioning unit 10 according to the first embodiment is expected to offer the features including: an improved efficiency of centrifugal blower 100, a simplified and compact structure of temperature conditioning unit 10, and reduced costs by reducing the number of parts that configure temperature conditioning unit 10.

Moreover, in temperature conditioning unit 10 according to the first embodiment, centrifugal blower 100 can be mounted to show a lower profile, that is, smaller height H of the blower. This is attributed to the direction in which centrifugal blower 100 is mounted to housing 300. In contrast, temperature conditioning unit 1010 shown in the Comparative Example is such that rotary shaft 1112a of forward fan 400 intersects airflow 301 that flows toward discharge hole 123. Accordingly, in temperature conditioning unit 1010 shown in the Comparative Example, a space on the outside of housing 310 has to be allocated, the size of which is large enough to accommodate the diameter of forward fan 400.

On the other hand, temperature conditioning unit 10 according to the first embodiment is such that rotary shaft 112a of impeller 110 is in the same direction as that of flowing of airflow 301 toward discharge hole 123. Therefore, in temperature conditioning unit 10 according to the first embodiment, a space required to be allocated on the outside of housing 310 may be small as long as the space can accommodate the height of impeller 110.

As can be seen from the above description, the temperature conditioning unit according to the first embodiment allows a reduction in distance "L" from the center of gravity of the centrifugal blower to the housing. In addition, the temperature conditioning unit according to the first embodiment eliminates the need for setting the duct to spread the airflow, which allows the centrifugal blower to be rigidly and stably mounted directly to the housing. As a result, the temperature conditioning unit according to the first embodiment can be handled as a single-unit air conditioner in which the centrifugal blower and the housing are integrally combined. Moreover, the temperature conditioning unit according to the first embodiment is so stable in balance that the installation of the unit need not rely on neighboring members. Therefore, the temperature conditioning unit according to the first embodiment eliminates the need for preparing different mounting parts depending on different usage environments for the temperature conditioning unit. That is, this allows commonality of the mounting part.

In particular, in the temperature conditioning unit according to the first embodiment, the rotation of the impeller causes air to be discharged toward radial directions of the impeller. The air having been discharged from the impeller is conducted to the direction along the rotary shaft of the impeller, via the flow path. This causes volute airflow in the housing, which is expected to distribute the air all around the inside of the housing.

Note that, in the temperature conditioning unit according to the first embodiment, the means of rigidly mounting the centrifugal blower to the housing may include screwing, welding, and latching with a latching part.

Moreover, as described above, in the temperature conditioning unit according to the first embodiment, the centrifugal blower can be mounted to show a lower profile from the housing. Accordingly, as shown in FIGS. 2, 3, and 4, in the temperature conditioning unit according to the first embodiment, the centrifugal blower may also be rigidly mounted on the upper, lower, inclined surface, or the like of the housing. That is, the temperature conditioning unit according to the first embodiment has a high degree of flexibility in mounting the centrifugal blower.

By the way, in the temperature conditioning unit according to the first embodiment, the impeller is such that the members configuring the impeller may use a material that includes either a metal or a resin. However, the material of the impeller's members is not particularly limited to this, and may be another material as long as it can provide the same functional effects.

Moreover, in the temperature conditioning unit according to the first embodiment, a stator winding that is included in the electric motor may use a material that includes any of copper, a copper alloy, aluminum, and an aluminum alloy. However, the material of the stator winding is not particularly limited to this, and may be another material as long as it can provide the same functional effects.

Second Exemplary Embodiment

Figure 6A:
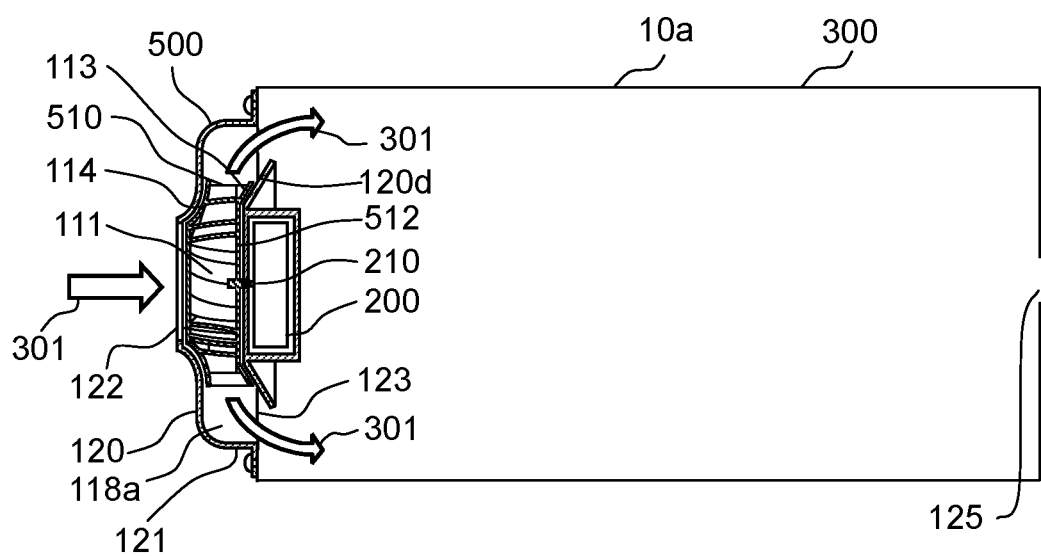
FIG. 6A is a schematic view of a temperature conditioning unit according to a second embodiment of the present invention.
Figure 6B:
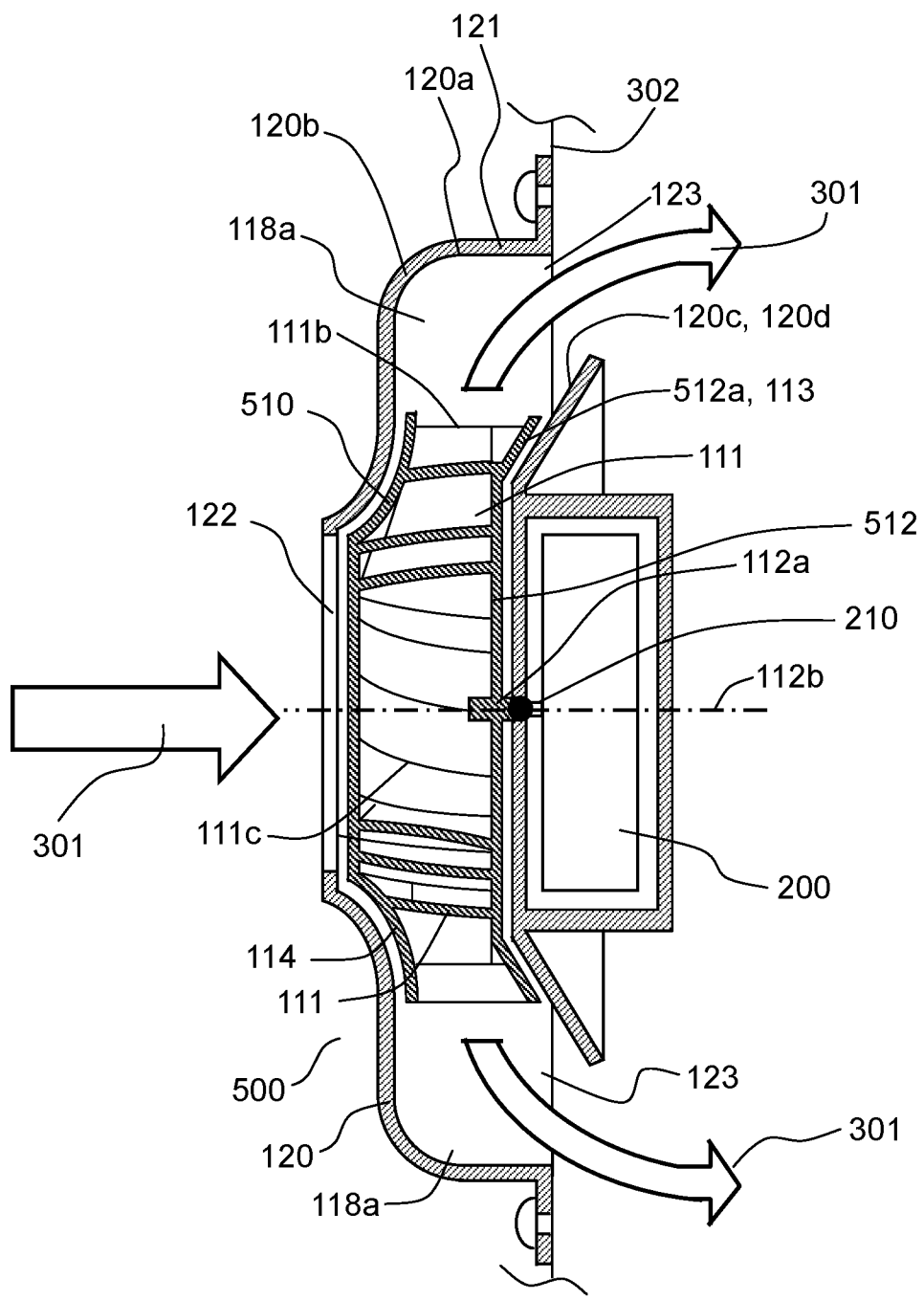
FIG. 6B is an enlarged view of a principal part of the temperature conditioning unit shown in FIG. 6A.

FIG. 6A is a schematic view of a temperature conditioning unit according to a second embodiment of the present invention. FIG. 6B is an enlarged view of a principal part of the temperature conditioning unit shown in FIG. 6A.

It should be noted that the same constituent elements as those of the temperature conditioning unit according to the first embodiment are designated by the same numerals and symbols, and their descriptions are incorporated herein by reference.

As shown in FIGS. 6A and 6B, the temperature conditioning unit according to the second embodiment of the present invention has the following configuration.

That is, flow path 118a further includes guide surface 120c that is located to face inner wall surface 120a. Guide surface 120c includes inclined part 120d, which is inclined in the direction of shaft center 112b, disposed at a range to discharge hole 123 from a portion of the guide surface in close proximity to outer-periphery-side edge 111b.

Alternatively, impeller disk 512 includes guide part 113, which is inclined in the direction toward the location of discharge hole 123, disposed in outer periphery part 512a of impeller disk 512.

More details will be described with reference to the drawings.

As shown in FIG. 1A, side wall 121 included in fan case 120 is formed in a substantially cylinder-like shape that is centered about rotary shaft 112a. With this shape, airflow 301 having been discharged from impeller 110 is greatly changed in its flowing direction, from radial directions of fan case 120 to the direction along shaft center 112b that passes through the center of fan case 120. Thus, in fan case 120, airflow 301 collides with the surface in a region from curved part 120b to inner wall surface 120a. Accordingly, airflow 301 sometimes suffers from a collision loss, a deflection loss, etc.

Hence, as shown in FIGS. 6A and 6B, temperature conditioning unit 10a according to the second embodiment of the present invention includes guide part 113 in outer periphery part 512a of impeller disk 512 that is included in impeller 510. Such a guide part is inclined toward the discharge hole 123 side, with respect to a plane intersecting rotary shaft 112a.

With guide part 113 that is formed in outer periphery part 512a of impeller disk 512, airflow 301 having been discharged from impeller 510 is guided, along guide part 113, toward discharge hole 123 that is located in the direction along shaft center 112b. That is, airflow 301 having been discharged from impeller 510 is split into roughly two streams, i.e. one is a stream along inner wall surface 120a of fan case 120 and the other is a stream along guide part 113. In other words, of the total volume of airflow 301 having been discharged from impeller 510, a volume of airflow that collides with inner wall surface 120a of fan case 120 can be reduced. Therefore, it is possible to reduce the collision loss of airflow 301 which occurs upon collision of the airflow with inner wall surface 120a of fan case 120. In addition, airflow 301 is guided by the stream along guide part 113 to flow into discharge hole 123. This allows the airflow to be smoothly subjected to the direction changing. Therefore, it is possible to reduce the deflection loss of airflow 301.

As a result, temperature conditioning unit 10a according to the second embodiment is improved in air-blowing efficiency of centrifugal blower 500. This, in turn, brings about improved energy savings in temperature conditioning unit 10a according to the second embodiment.

Note that, as shown in FIGS. 6A and 6B, in temperature conditioning unit 10a according to the second embodiment, guide surface 120c which is located to face inner wall surface 120a is inclined toward the discharge hole 123 side, with respect to a plane that intersects rotary shaft 112a. With guide surface 120c that is formed along guide part 113, airflow 301 having been discharged from impeller 510 is smoothly guided, from guide part 113 through guide surface 120c to discharge hole 123. Therefore, this configuration can bring about a further reduction in losses that airflow 301 has conventionally had.

Third Exemplary Embodiment

Figure 7:
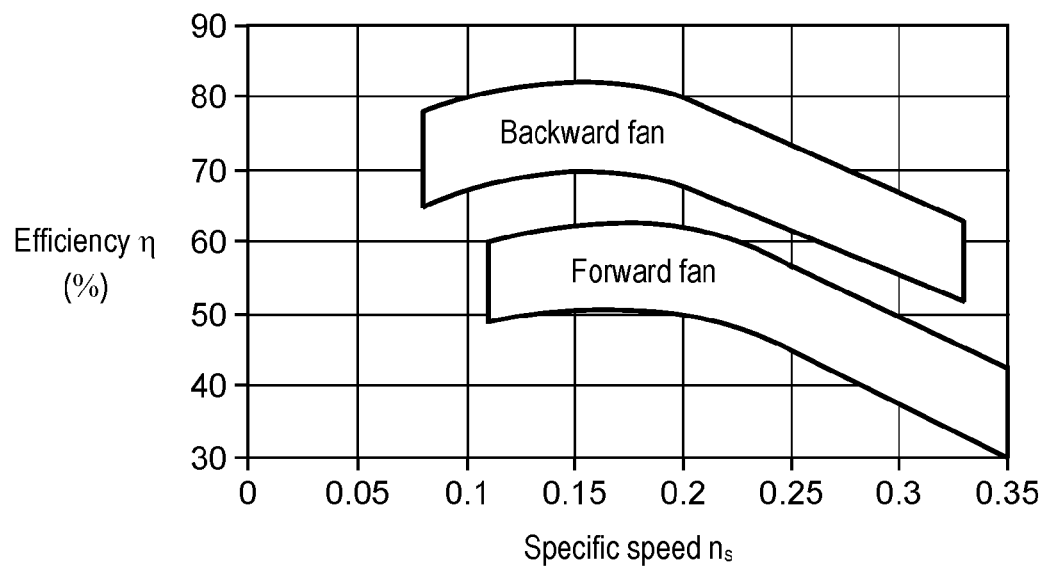
FIG. 7 is a graph showing efficiency characteristics of an impeller used in a temperature conditioning unit according to a third embodiment of the present invention, and those of an impeller used in the Comparative Example.
Figure 8:
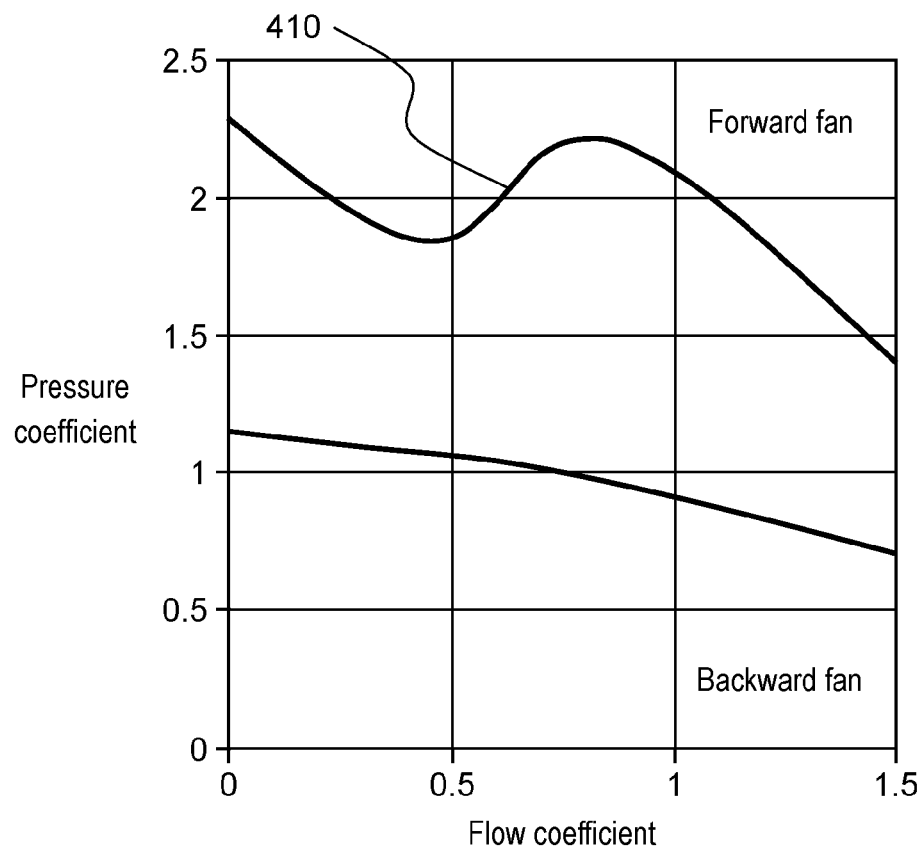
FIG. 8 is a graph showing a characteristic relation between a flow coefficient and a pressure coefficient of the impeller used in the temperature conditioning unit according to the third embodiment of the present invention, in comparison with that of the impeller used in the Comparative Example.
Figure 9A:
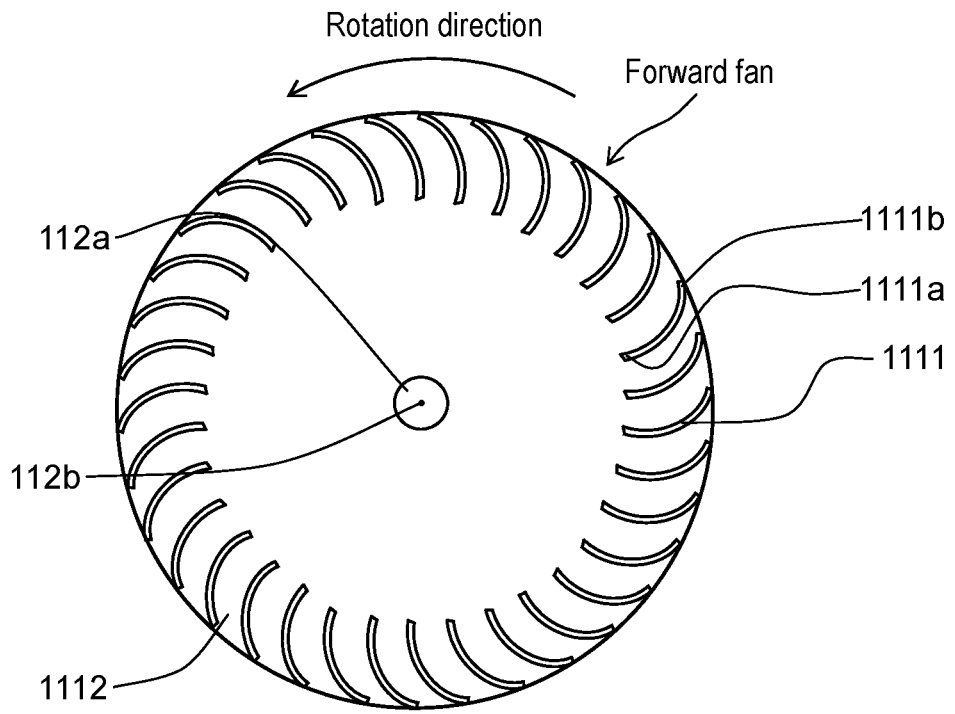
FIG. 9A is a view illustrating a shape of rotor blades of the impeller used in the temperature conditioning unit in the Comparative Example to be compared with Examples of the present invention.
Figure 9B:
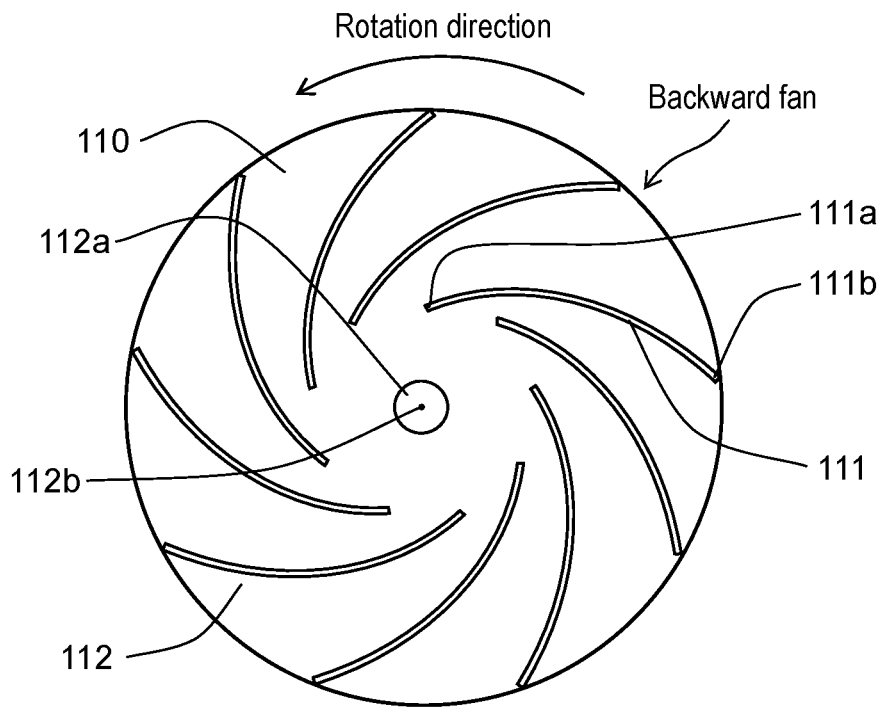
FIG. 9B is a view illustrating a shape of rotor blades of the impeller used in the temperature conditioning unit according to the third embodiment of the present invention.
Figure 10A:
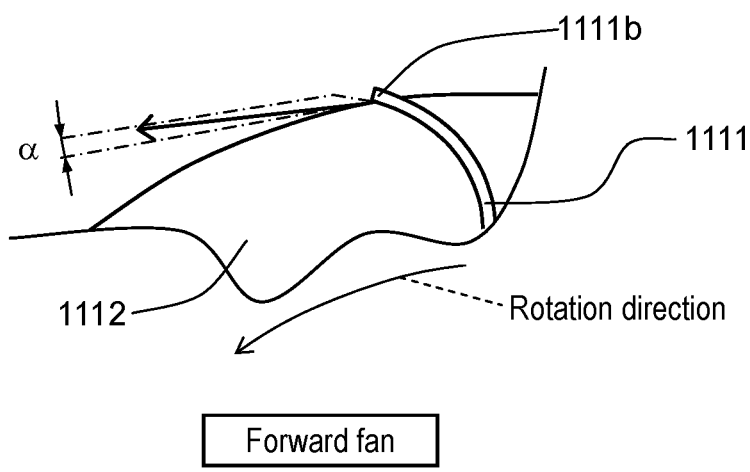
FIG. 10A is an enlarged view of a principal part of each of the rotor blades shown in FIG. 9A.
Figure 10B:
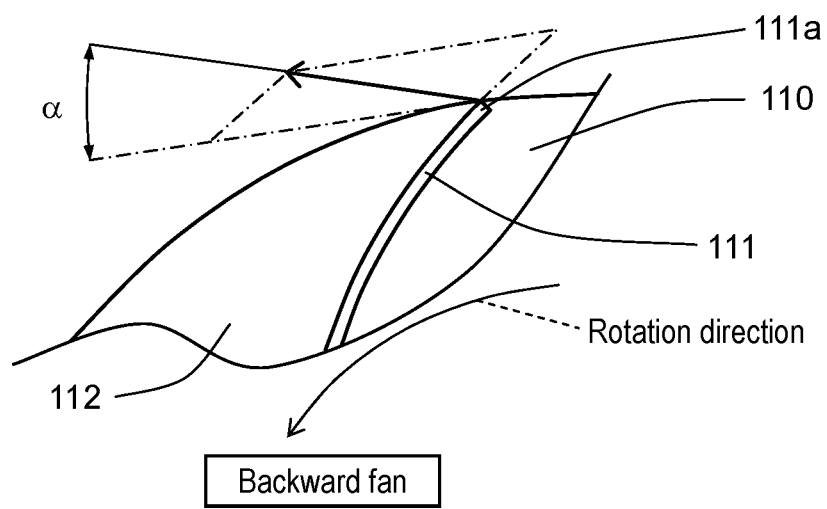
FIG. 10B is an enlarged view of a principal part of each of the rotor blades shown in FIG. 9B.
Figure 11:
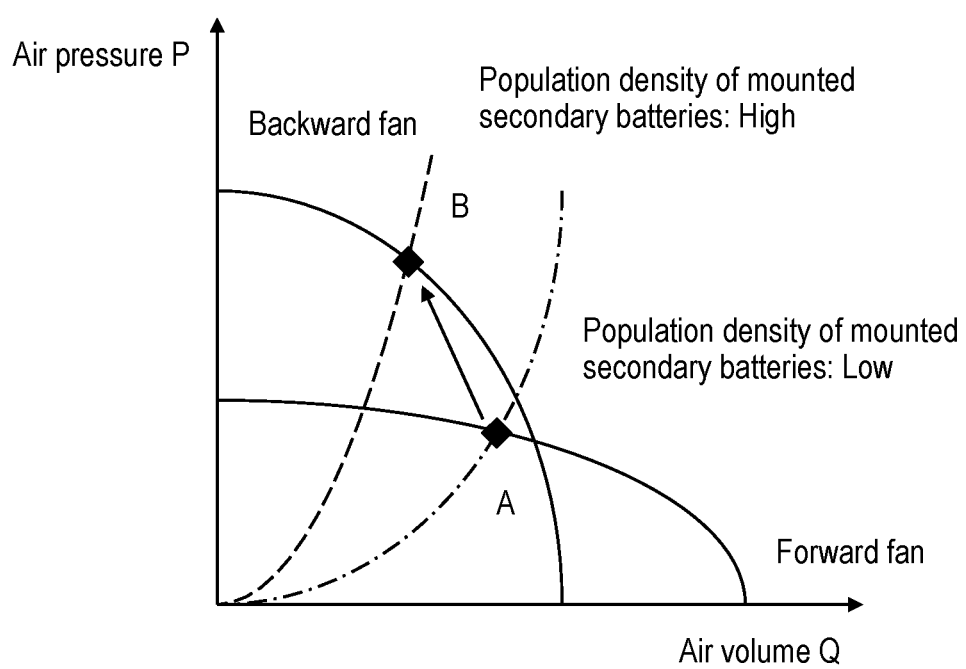
FIG. 11 is a graph showing a relation between air volume and air pressure in the impeller used in the temperature conditioning unit according to the third embodiment of the present invention, in comparison with that in the impeller used in the Comparative Example.

FIG. 7 is a graph showing efficiency characteristics of an impeller used in a temperature conditioning unit according to a third embodiment of the present invention, and those of an impeller used in a Comparative Example. FIG. 8 is a graph showing a characteristic relation between a flow coefficient and a pressure coefficient of the impeller used in the temperature conditioning unit according to the third embodiment of the invention, in comparison with that of the impeller used in the Comparative Example. FIG. 9A is a view illustrating a shape of rotor blades of the impeller used in the temperature conditioning unit in the Comparative Example to be compared with the Examples of the invention. FIG. 9B is a view illustrating a shape of rotor blades of the impeller used in the temperature conditioning unit according to the third embodiment of the invention. FIG. 10A is an enlarged view of a principal part of each of the rotor blades shown in FIG. 9A. FIG. 10B is an enlarged view of a principal part of each of the rotor blades shown in FIG. 9B. FIG. 11 is a graph showing a relation between air volume and air pressure in the impeller used in the temperature conditioning unit according to the third embodiment of the invention, in comparison with that in the impeller used in the Comparative Example.

Figure 12:
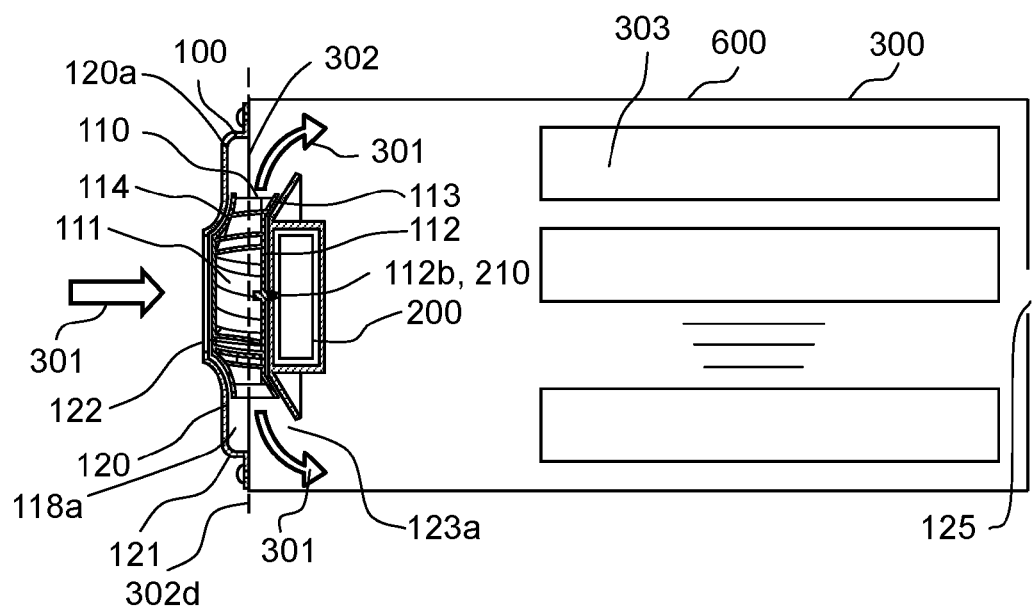
FIG. 12 is a schematic view of the temperature conditioning unit according to the third embodiment of the present invention.
Figure 13:
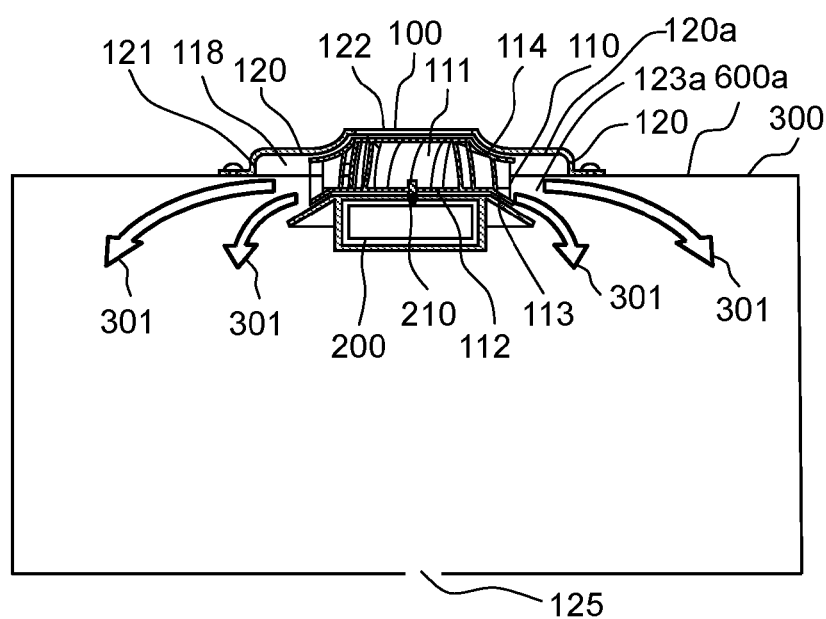
FIG. 13 is a schematic view of another temperature conditioning unit according to the third embodiment of the present invention.
Figure 14:
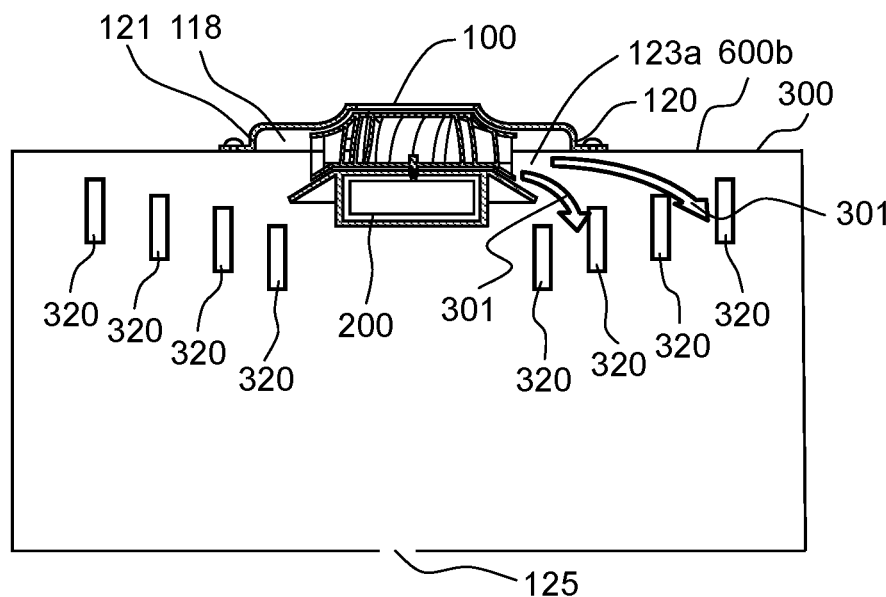
FIG. 14 is a schematic view of further another temperature conditioning unit according to the third embodiment of the present invention.

Moreover, FIG. 12 is a schematic view of the temperature conditioning unit according to the third embodiment of the invention. FIG. 13 is a schematic view of another temperature conditioning unit according to the third embodiment of the invention. FIG. 14 is a schematic view of further another temperature conditioning unit according to the third embodiment of the invention.

It should be noted that the same constituent elements as those of the temperature conditioning units according to the first and second embodiments are designated by the same numerals and symbols, and their descriptions are incorporated herein by reference.

As shown in FIGS. 9B, 12, and 14, temperature conditioning units 600, 600a, and 600b according to the third embodiment of the present invention, have the following configurations.

That is, as shown in FIG. 9B, each of a plurality of rotor blades 111 is disposed such that inner-periphery-side edge 111a is positioned in front of outer-periphery-side edge 111b, in the direction of rotation of impeller 110.

Moreover, as shown in FIG. 12, when fan case 120 is mounted to housing 300, discharge hole 123a is located deeper inside housing 300 than surface 302d that is a plane extending from external surface 302.

Furthermore, as shown in FIG. 14, fan case 120 is mounted to housing 300; housing 300 further includes regulating plates 320 at locations facing discharge hole 123a. Such regulating plates can regulate airflow 301 having been discharged from flow path 118 via discharge hole 123a.

More details will be described with reference to the drawings.

As shown in FIGS. 12 to 14, temperature conditioning units 600, 600a, and 600b according to the third embodiment of the present invention can be used to condition temperature of automotive secondary battery 303. Hereinafter, the automotive secondary battery is sometimes referred to simply as the secondary battery.

By the way, for secondary battery 303, it is required to suppress a temperature rise of the battery caused by higher output. Moreover, secondary battery 303, being an automotive component, is required to have its smallest possible footprint. Then, temperature conditioning units 600, 600a, and 600b are required to accommodate secondary batteries 303 in a high population density in the inside housing 300. The higher the population density of secondary batteries 303 accommodated inside housing 300 is, the more the output of centrifugal blower 100 is required in order to perform the temperature conditioning of secondary batteries 303.

The advantages of no use of the scroll casing in the first embodiment have already been described. In the third embodiment, advantages of temperature conditioning units 600, 600a, and 600b according to the third embodiment will be described through a comparison, to be described later, between a forward fan and a backward fan.

2. Comparison Between a Forward Fan and a Backward Fan

FIG. 7 shows a relation between specific speed "$n_s$" and efficiency "$\eta$" of each of the forward and backward fans which configure the respective impeller. The specific speed and the efficiency are dimensionless quantities. Specific speed "$n_s$" is defined as the following Equation (1).

$$n_s = N \frac{\sqrt{Q}}{\left(\sqrt[4]{gH}\right)^3} \qquad \text{Equation (1)}$$

In Equation (1), "N" is the rotation number, "Q" is the flow rate, "g" is the acceleration of gravity, and "H" is head at blades.

In general, the forward fan has a larger deceleration ratio of relative speeds between the rotor blades, leading to a larger secondary flow loss. Accordingly, the forward fan is lower in efficiency than the backward fan.

Next, FIG. 8 is a graph showing a relation between a flow coefficient and a pressure coefficient of the forward fan and that of the backward fan.

As shown in FIG. 8, the forward fan is higher in work coefficient than the backward fan. However, when operating at lower flow rates, the forward fan shows unstable region 410 in which its characteristics change in pressure coefficient, from a downward from-left-to-right slope to an upward from-left-to-right slope, with increasing flow coefficient.

In contrast, the backward fan is lower in work coefficient than the forward fan. However, the backward fan, unlike the forward fan, shows no unstable region in which the characteristics change. Accordingly, the backward fan can be stably used over the entire region of the flow coefficient, which allows high-speed rotation, resulting in higher output power.

FIGS. 9A and 9B are cross-sectional views of rotor blades of the forward fan exemplified in the Comparative Example, and those of the backward fan adopted in the third embodiment of the present invention, respectively. Each of the cross sections is taken in a plane perpendicular to rotary shaft 112a of the corresponding fan. FIGS. 10A and 10B show velocity triangles at rotor blade outlets of the forward fan and the backward fan, respectively, which are depicted there for a comparison between them.

As shown in FIGS. 9A and 10A, with the forward fan, each of rotor blades 1111 has a cross-sectional circular arc shape, in the direction intersecting rotary shaft 112a, which is a concave form curving toward the direction of rotation of impeller disk 1112. Rotor blade 1111 is configured such that inner-periphery-side edge 1111a located on the rotary shaft 112a side is positioned in back of outer-periphery-side edge 1111b located on the opposite rotary-shaft side.

When the forward fan rotates, outlet angle α1 of the air discharged from each of rotor blades 1111 is small, with the outlet angle being made relative to the tangential direction of the outer periphery of impeller disk 1112. Accordingly, in the case of the forward fan being used, the flow-component toward a radial direction of impeller disk 1112 is so small that it is difficult for the airflow to reach a distant place.

On the other hand, as shown in FIGS. 9B and 10B, with the backward fan, each of rotor blades 111 has a cross-sectional circular arc shape, in the direction intersecting rotary shaft 112a, which is a convex form curving toward the direction of rotation of impeller disk 112. Rotor blade 111 is configured such that inner-periphery-side edge 111a located on the rotary shaft 112a side is positioned in front of outer-periphery-side edge 111b located on the opposite rotary-shaft side.

When the backward fan rotates, outlet angle α2 of the air discharged from each of rotor blades 111 is large, with the outlet angle being made relative to the tangential direction of the outer periphery of impeller disk 112. Accordingly, in the case of the backward fan being used, the flow-component toward a radial direction of impeller disk 112 is so large that it is possible to allow the airflow to reach a distant place.

Moreover, as shown in FIG. 11, with the forward fan, a static pressure is difficult to increase through use of the fan alone. Thus, in the case of the forward fan being used, the static pressure is recovered by the fan case, that is, through use of a scroll casing and the like.

On the other hand, as shown in FIG. 9B, with the backward fan, the length of each of rotor blades 111 is large in the radial direction of impeller disk 112. Hence, when impeller 110 rotates, a difference in velocity of the airflow becomes larger between inner-periphery-side edge 111a serving as the inlet of rotor blade 111 and outer-periphery-side edge 111b serving as the outlet of rotor blade 111. Thus, as shown in FIG. 11, the backward fan is capable of increasing static pressure by itself. Therefore, in the case of temperature conditioning unit 600 being used according to the third embodiment, the operating point shifts from point "A" to point "B" as the population density of mounted secondary batteries 303 is increased, with the batteries being accommodated in housing 300.

Utilizing of such properties described above allows further downsizing of temperature conditioning unit 600. That is, as shown in FIG. 12, in the third embodiment, impeller 110 is mounted to temperature conditioning unit 600 such that the impeller is positioned in the inside of housing 300. This means that discharge hole 123a of centrifugal blower 100 is located deeper inside housing 300 than surface 302d that is a plane extending from external surface 302 of housing 300. As described above, the backward fan serving as impeller 110 is capable of supplying the sufficient airflow to the inside of housing 300.

This configuration can offer the following functional advantages. That is, centrifugal blower 100 can be configured to be buried in housing 300. Consequently, temperature conditioning unit 600 according to the third embodiment can be reduced in profile of fan case 120 that protrudes from housing 300. Therefore, temperature conditioning unit 600 according to the third embodiment can be downsized, thereby achieving space savings.

Moreover, temperature conditioning unit 600 according to the third embodiment guides airflow 301, which has been discharged from impeller 110, directly into the inside of housing 300. In other words, of airflow 301 discharged from impeller 110, airflow which collides with inner wall surface 120a of fan case 120 can be reduced in amount. Consequently, temperature conditioning unit 600 according to the third embodiment can reduce the collision and deflection losses of airflow 301 which occur at wall surface 120a of fan case 120. As a result, temperature conditioning unit 600 according to the third embodiment is improved in air-blowing efficiency of centrifugal blower 100. Thus, temperature conditioning unit 600 according to the third embodiment is improved in energy saving.

Note that, at the periphery of the impeller, the flow velocity distribution of the airflow discharged from the impeller varies depending on the operating point and specifications of the impeller. Hence, in the temperature conditioning unit according to the third embodiment, it is difficult to unambiguously derive a relation between the depth at which the centrifugal blower is buried in the inside of the housing and the amount of reduced losses of the airflow which has been discharged from the impeller.

FIG. 13 shows a further example of the applications. That is, as shown in FIG. 13, another exemplified application of temperature conditioning unit 600a according to the third embodiment is configured such that centrifugal blower 100 is mounted on a longitudinal side of housing 300.

The configuration can further reduce factors in hindering airflow 301 which has been discharged from impeller 110, in the vicinity of centrifugal blower 100. Moreover, the configuration can further enhance the advantageous characteristics of the backward fan with which airflow 301 is allowed to reach a distant place in the radial direction of impeller disk 112. Note that, in FIG. 13, the radial direction of impeller disk 112 is the left-and-right direction. Hence, the efficiency of centrifugal blower 100 can be expected to be further improved.

As can be seen from the above description, the temperature conditioning unit according to the third embodiment utilizes the characteristics of the backward fan, thereby reducing the contribution from the flow path which is configured with the fan case. Through use of the impeller alone, the airflow having been discharged from the backward fan is allowed to spread over a wide region. Therefore, the temperature conditioning unit according to the third embodiment can perform the air conditioning with much higher efficiency, resulting in expected energy savings.

By the way, as shown in FIG. 5, the conventional automotive air conditioner, i.e. the Comparative Example, has used the duct to spread the biased airflow that has been discharged from the centrifugal blower. The airflow circuit in which the duct is configured has a complicated structure.

Here, as shown in FIG. 14, regulating plates 320 are also added to temperature conditioning unit 600b according to the third embodiment. For convenience of description, let the up-and-down direction in FIG. 14 denote the up-and-down direction of housing 300. Similarly, let the left-and-right direction in FIG. 14 denote the left-and-right direction of housing 300.

In temperature conditioning unit 600b according to the third embodiment, regulating plates 320 are arranged such that each of the regulating plates is located sequentially at a slightly upper position at a greater distance away from the central portion of centrifugal blower 100 toward each of the longitudinal ends of housing 300. With this configuration, the additional setting of regulating plates 320 in the inside of housing 300 allows airflow 301 to be optionally regulated.

In the above description, the temperature conditioning unit serves as the temperature conditioning apparatus for the automotive secondary battery. The vehicle in this case may be a hybrid vehicle or an electric vehicle. In other examples of the temperature conditioning unit according to the third embodiment, the members to be temperature-conditioned may include an electric-power conversion apparatus. In particular, the electric-power conversion apparatus, i.e. the member to be temperature-conditioned, includes an automotive electric-power conversion apparatus. Moreover, other electric-power conversion apparatuses may also be applied to an engine control unit, an inverter device, the temperature conditioner of an electric motor, etc.

Fourth Exemplary Embodiment

Figure 15A:
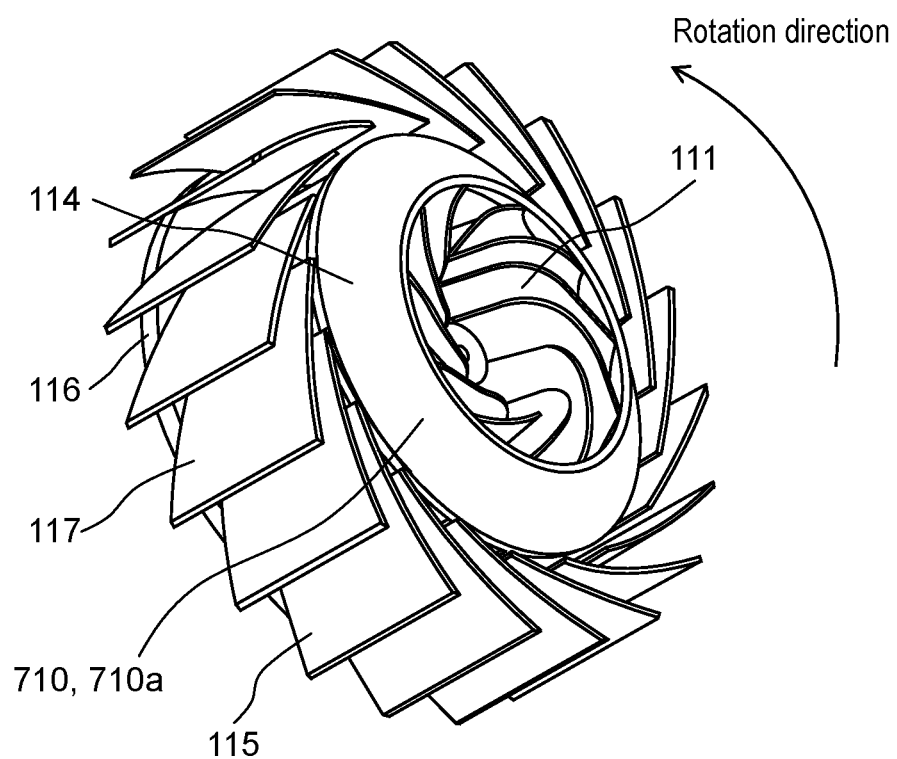
FIG. 15A is a perspective view of an impeller and a diffuser used in a temperature conditioning unit according to a fourth embodiment of the present invention.
Figure 15B:
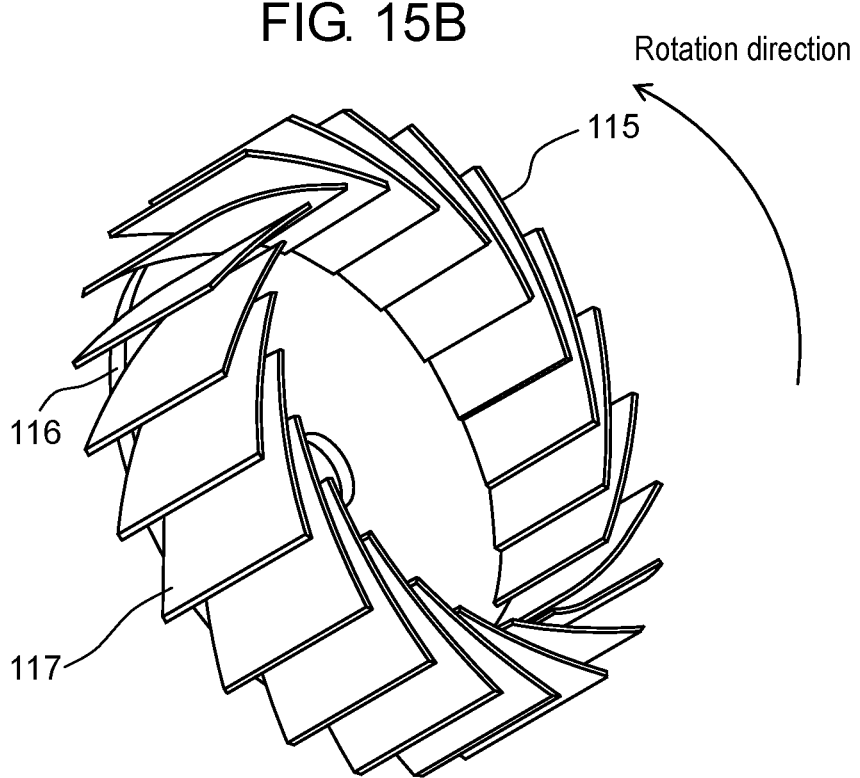
FIG. 15B is a front perspective view of the diffuser used in the temperature conditioning unit according to the fourth embodiment of the present invention.
Figure 15C:
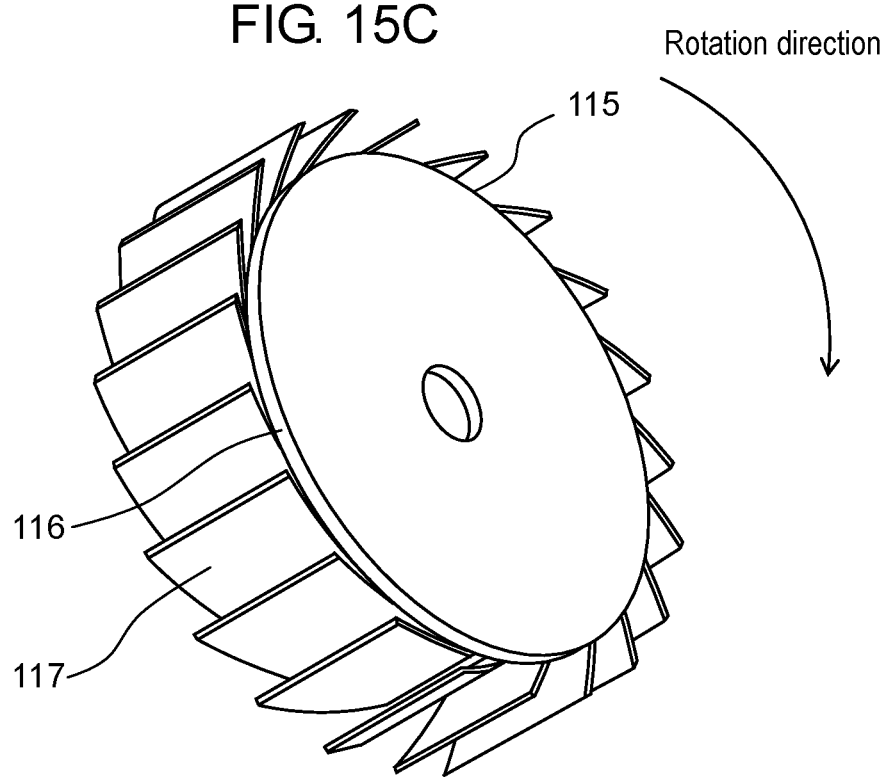
FIG. 15C is a rear perspective view of the diffuser used in the temperature conditioning unit according to the fourth embodiment of the present invention.
Figure 15D:
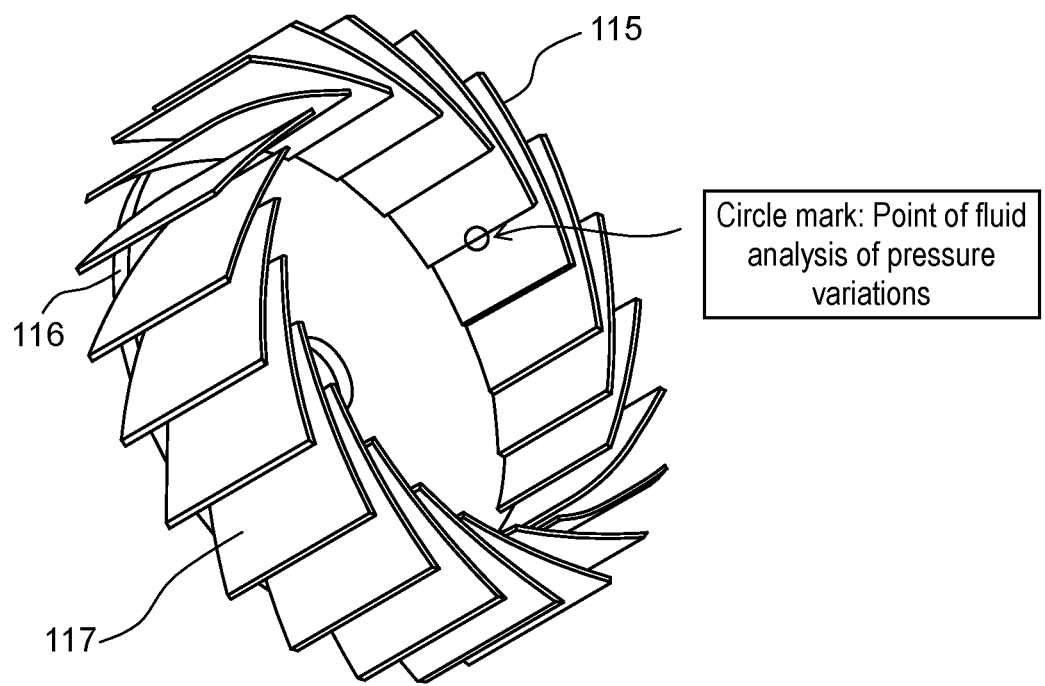
FIG. 15D is a view for illustrating a position at which pressure variations are measured in the diffuser used in the temperature conditioning unit according to the fourth embodiment of the present invention.
Figure 15E:
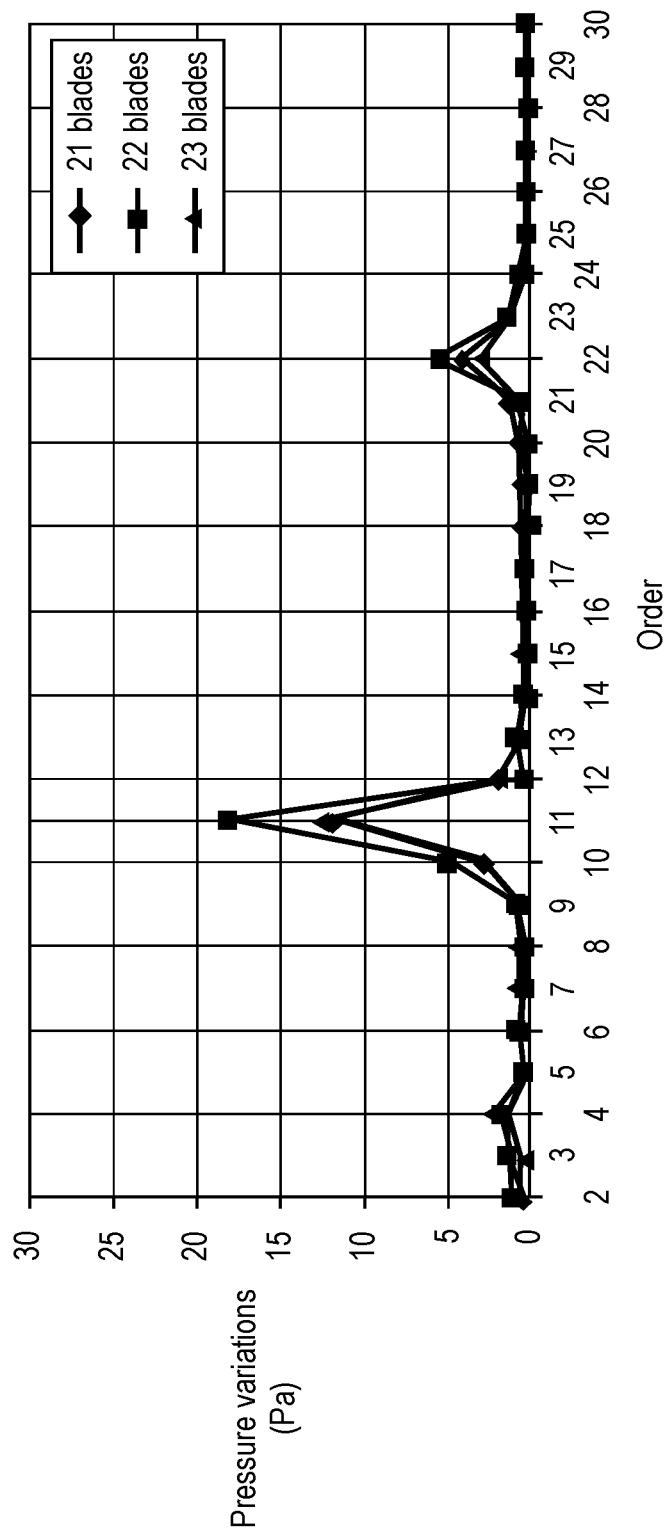
FIG. 15E is a characteristic graph showing the result from the pressure variation measurement for the diffusers used in the temperature conditioning unit according to the fourth embodiment of the present invention.

FIG. 15A is a perspective view of an impeller and a diffuser used in a temperature conditioning unit according to a fourth embodiment of the present invention. FIG. 15B is a front perspective view of the diffuser used in the temperature conditioning unit according to the fourth embodiment of the invention. FIG. 15C is a rear perspective view of the diffuser used in the temperature conditioning unit according to the fourth embodiment of the invention. FIG. 15D is a view for illustrating a point at which pressure variations are measured in the diffuser used in the temperature conditioning unit according to the fourth embodiment of the invention. FIG. 15E is a characteristic graph showing the result from the pressure variation measurement for the diffusers used in the temperature conditioning unit according to the fourth embodiment of the invention.

It should be noted that the same constituent elements as those of the temperature conditioning units according to the first to third embodiments are designated by the same numerals and symbols, and their descriptions are incorporated herein by reference.

As shown in FIGS. 15A to 15C, the temperature conditioning unit according to the fourth embodiment of the invention can use the following impeller and diffuser.

That is, impeller 710 further includes a plurality of stator blades 117. Each of the plurality of stator blades 117 protrudes forward from a position at the outer periphery of the impeller disk, in the direction of rotation of impeller 710.

Alternatively, impeller 710a is further equipped with diffuser 115 which includes diffuser plate 116 and a plurality of stator blades 117. Diffuser plate 116 is located in parallel with the impeller disk. Each of the plurality of stator blades 117 extends, in the direction along the rotary shaft (112a), from a surface included in diffuser plate 116 and located on the suction hole side of the diffuser plate. Each of the plurality of stator blades 117 protrudes forward from a position at the outer periphery of the impeller disk, in the direction of rotation of impeller 710a.

In particular, modes capable of offering outstanding functional effects are as follows.

That is, let Zf be the number of the plurality of the rotor blades (111); let Zd be the number of the plurality of stator blades 117; let "F" be a divisor of number Zf; and let "n" be a natural number.

In this mode, the temperature conditioning unit satisfies the relation Zd ≠n×F.

Moreover, in another mode, let Zf be the number of the rotor blades (111).

Let Zd be the number of the plurality of stator blades 117; let "m" and "n" be each a natural number; let "P" be the number of poles which an electric motor includes; let "S" be the number of slots which the electric motor includes; let "C" be the least common multiple of the number "P" of the poles and the number "S" of the slots; and let "D" be a divisor of least common multiple "C."

In this mode, the temperature conditioning unit satisfies the relations: m×Zf≠n×P, m×Zf≠n×S, and Zf≠n×D.

Furthermore, in further another mode, let Zf be the number of the rotor blades (111).

Let Zd be the number of the plurality of stator blades 117; let "F" be a divisor of Zf; let "m" and "n" be each a natural number; let "P" be the number of poles which an electric motor includes; let "S" be the number of slots which the electric motor includes; let "C" be the least common multiple of the number "P" of the poles and the number "S" of the slots; and let "D" be a divisor of least common multiple "C."

In this mode, the temperature conditioning unit satisfies the relations: m×Zf≠n×P, m×Zf≠n×S, Zf≠n×D, and Zd≠n×F.

Diffuser 115 is such that a member configuring diffuser 115 may use a material that includes one of a metal and a resin.

More details will be described with reference to the drawings.

The temperature conditioning unit according to the fourth embodiment of the present invention has the configuration in which a diffuser is further included in each of the configurations described above in the first to third embodiments.

Such a diffuser is located between the impeller and the electric motor serving as a rotary drive source. As shown in FIG. 15A, diffuser 115 includes diffuser plate 116 and the plurality of stator blades 117. Diffuser plate 116 is formed in the plane that extends in the direction intersecting the shaft (210) included in the electric motor (200). Diffuser plate 116 has a substantially disk-like shape. The plurality of stator blades 117 is formed on the surface included in diffuser plate 116, with the surface being on the side on which the suction hole (122) is located. The plurality of stator blades 117 rectifies centrifugal airflow which has been discharged from impeller 110.

Diffuser 115 can provide the following functional effects. Diffuser 115 decelerates the centrifugal airflow, which has been discharged from impeller 710, during its flowing through between blades of the plurality of stator blades 117. In addition, diffuser 115 increases the pressure of the centrifugal airflow which has been discharged from impeller 710. Thus, the pressure of the centrifugal airflow is increased, with the airflow having been discharged from the centrifugal blower including diffuser 115.

FIG. 15A is a view of impeller 710 in the state in which diffuser 115 described above has been added to the impeller. FIG. 15B is a view of diffuser 115 described above, viewed from a front oblique direction. Likewise, FIG. 15C is a view of diffuser 115 described above, viewed from a rear oblique direction.

By the way, when the centrifugal airflow having been discharged from impeller 710, 710a is rectified by means of the plurality of stator blades 117 of diffuser 115, it generates noise. The noise is attributed to turbulent flow and the like that occurs between the plurality of rotor blades 111 of impeller 710, 710a and the plurality of stator blades 117 of diffuser 115. The noise is called blade passing frequency (BPF) noise or discrete frequency noise. In the following descriptions, such a noise is referred to as the BPF noise.

Thus, to reduce the noise, the temperature conditioning unit according to the fourth embodiment adopts the following examples of the configurations.

First Configuration Example

Let $Zf$ be the number of the plurality of the rotor blades (111) which impeller 710, 710a includes; let $Zd$ be the number of the plurality of stator blades 117 which diffuser 115 includes; let "F" be a divisor of number $Zf$ of the plurality of the rotor blades (111) which impeller 710, 710a includes; and let "n" be a natural number.

In this example, the temperature conditioning unit according to the fourth embodiment has the configuration that satisfies the relation $Zd \neq n \times F$.

This configuration allows a reduction in occurrence of the BPF noise.

By the way, frequency $Fn$ of the BPF noise is expressed as $Fn = N/60 \times Zf$, where N (r/min) is the rotation number of impeller 710, 710a.

Second Configuration Example

Let $Zf$ be the number of the plurality of the rotor blades (111) which impeller 710, 710a includes; let $Zd$ be the number of the plurality of stator blades 117 which diffuser 115 includes; let "m" and "n" be each a natural number; let "P" be the number of poles which an electric motor includes; let "S" be the number of slots which the electric motor includes; let "C" be the least common multiple of the number "P" of the poles and the number "S" of the slots; least common multiple "C" expresses the order of cogging torque which the motor includes; and let "D" be a divisor of least common multiple "C."

In this example, the temperature conditioning unit according to the fourth embodiment has the configuration that satisfies the relations: $m \times Zf \neq n \times P$, $m \times Zf \neq n \times S$, and $Zf \neq n \times D$.

This configuration allows a reduction in occurrence of the BPF noise.

By the way, frequency $Fc$ of noise attributed to the cogging torque, which the motor includes, is expressed as $Fc = N/60 \times L$ (Hz) where N (r/min) is the rotation number of the impeller.

Note that "the noise attributed to the cogging torque which the motor includes" can also be said as "the vibration attributed to the cogging torque which the motor includes."

Third Configuration Example

A third example of the configurations is one that satisfies simultaneously the relations in the first and second examples described above of the configurations. That is, in this example, the temperature conditioning unit according to the fourth embodiment has the configuration that satisfies the relations: $m \times Zf \neq n \times P$, $m \times Zf \neq n \times S$, $Zf \neq n \times D$, and $zZd \neq n \times F$.

3. Verification of Comparative Example

Hereinafter, a verification of a specific Comparative Example will be described.

In general, the number "P" of poles that an electric motor includes is a multiple of 2 (two). Moreover, with a three-phase electric motor, the number "S" of slots that the motor includes is a multiple of 3 (three). Accordingly, the number $Zf$ of a plurality of rotor blades that an impeller includes is preferably a prime number.

The reason for this is as follows: The motor and impeller mutually generate exciting forces that act on each other, in cases where the number $Zf$ of the plurality of the rotor blades included in the impeller is equal to either a multiple or a divisor of the number "P" of the poles included in the motor, or alternatively, equal to either a multiple or a divisor of the number "S" of the slots included in the motor. These forces excite resonances in the motor and impeller, causing an increase in noise from them.

Moreover, there are cases where parts configuring a motor suffer from distortions for any reason when the motor is manufactured. In these cases, vibration sometimes occur with a frequency higher than the rotation number of the motor by a factor of "D," where "D" is a divisor of order "C" of the cogging torque.

The countermeasures against this include the following. Let "D" be a devisor of least common multiple "C" of the number "P" of the poles included in the motor and the number "S" of the slots included in the motor. In this case, for the temperature conditioning unit, devisor "D" is taken to be not equal to the number of the plurality of the rotor blades that the impeller includes. This configuration allows the temperature conditioning unit to inhibit an increase in degrees of vibrations and noises.

Note that, in many cases, an automotive temperature conditioning unit uses an impeller with an output of several tens of watts. Then, with the automotive temperature conditioning unit, a plurality of rotor blades of the impeller is often formed such that the number of the rotor blades ranges from approximately 7 (seven) to approximately 15. The reason for this is a trade-off between a rectifying effect via inter-blade airflow by using the diffuser and a friction loss caused by surfaces of the stator blades that configure the diffuser.

Here, a specific example is described. Specifications of the example are as follows: That is, the number "P" of poles that an electric motor includes is 10. the number "S" of slots that the motor includes is 12. The number of a plurality of rotor blades that an impeller includes is 11. In this example, the number of a plurality of stator blades that a diffuser includes is varied for comparison. Different diffusers are prepared with the different numbers of the plurality of the stator blades, i.e. 21, 22, and 23 stator blades.

The comparison is made through calculations, by a fluid analysis, of pressure variations at the leading edge of one of the plurality of stator blades that the diffuser includes. The analyzed point at the leading edge is indicated by the circle shown in FIG. 15D. FIG. 15E shows the result from the fast Fourier transform (FFT) analysis of the pressure variations.

As shown in FIG. 15E, the pressure variations become the largest in the case where the number of the plurality of the stator blades that the diffuser includes is 22. The number of 22 is equal to an integral multiple of the number of the plurality of the rotor blades that the impeller includes.

Moreover, the result shows more favorable performance when the number of the plurality of the stator blades of the diffuser is 21 than when that is 23. It is noted that the pressure variations shown here are responsible for the BPF noise.

Here, in the case where the number of the rotor blades of the impeller is 11, let a fundamental harmonic be equal in frequency to the eleventh order of the rotation frequency attributed to the rotation of the impeller. In other words, the frequency of the fundamental harmonic in this case is equal to the eleventh order of the rotation frequency caused by the rotation of the impeller, and is equal to a multiple of both the number of the rotor blades of the impeller and the rotation frequency, i.e. eleven-fold higher than the rotation frequency. The fundamental harmonic is denoted by Nz. That is, the 22nd order of the rotation frequency caused by the rotation of the impeller is expressed as 2Nz that means the second harmonic.

Nz can be calculated by the following equation.

Nz=rotation frequency "N" (Hz)×the number "z" of the rotor blades of the impeller, where the unit (Hz) of rotation frequency "N" is also expressed as "rps" that is an abbreviation for "revolutions per second." Moreover, the number "z" of the rotor blades that the impeller includes is a dimensionless number, having no unit.

The result from the FFT analysis described above shows a remarkable difference in amplitude of the pressure variations between Nz, i.e. 11th order of the rotation frequency, and 2Nz, i.e. 22nd order of the rotation frequency.

Moreover, in the temperature conditioning unit, it is possible to increase the order of the cogging torque by increasing the number "P" of the poles that the motor includes. Unfortunately, increasing the order of the cogging torque by increasing the number "P" of the poles of the motor results in an increased ratio of an inter-pole magnetic leakage flux to a main magnetic flux that the motor has. This reduces the amount of an effective magnetic flux utilizable by the motor, leading to a decreased efficiency of the motor.

Therefore, in the specific example described above, the motor having 10 poles and 12 slots is chosen with consideration given to an increase in the order of the cogging torque. In the choice, the efficiency of the motor is also considered, so that the numbers of the poles and slots are chosen to achieve an increase in their respective least common multiples with the number of the plurality of the rotor blades that the impeller includes.

Fifth Exemplary Embodiment

Figure 16:
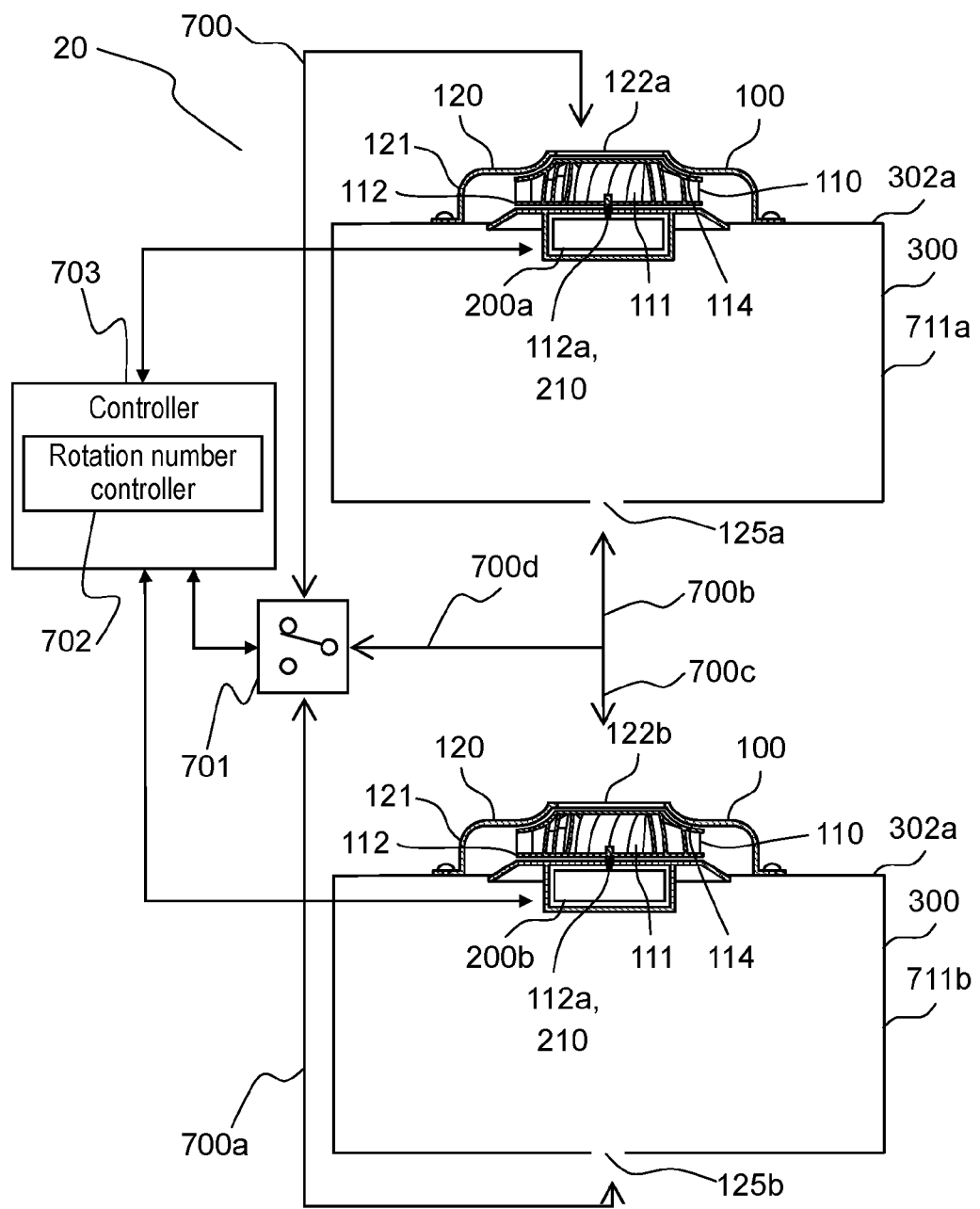
FIG. 16 is a schematic view of a system configuration of a temperature conditioning system according to a fifth embodiment of the present invention.
Figure 17:
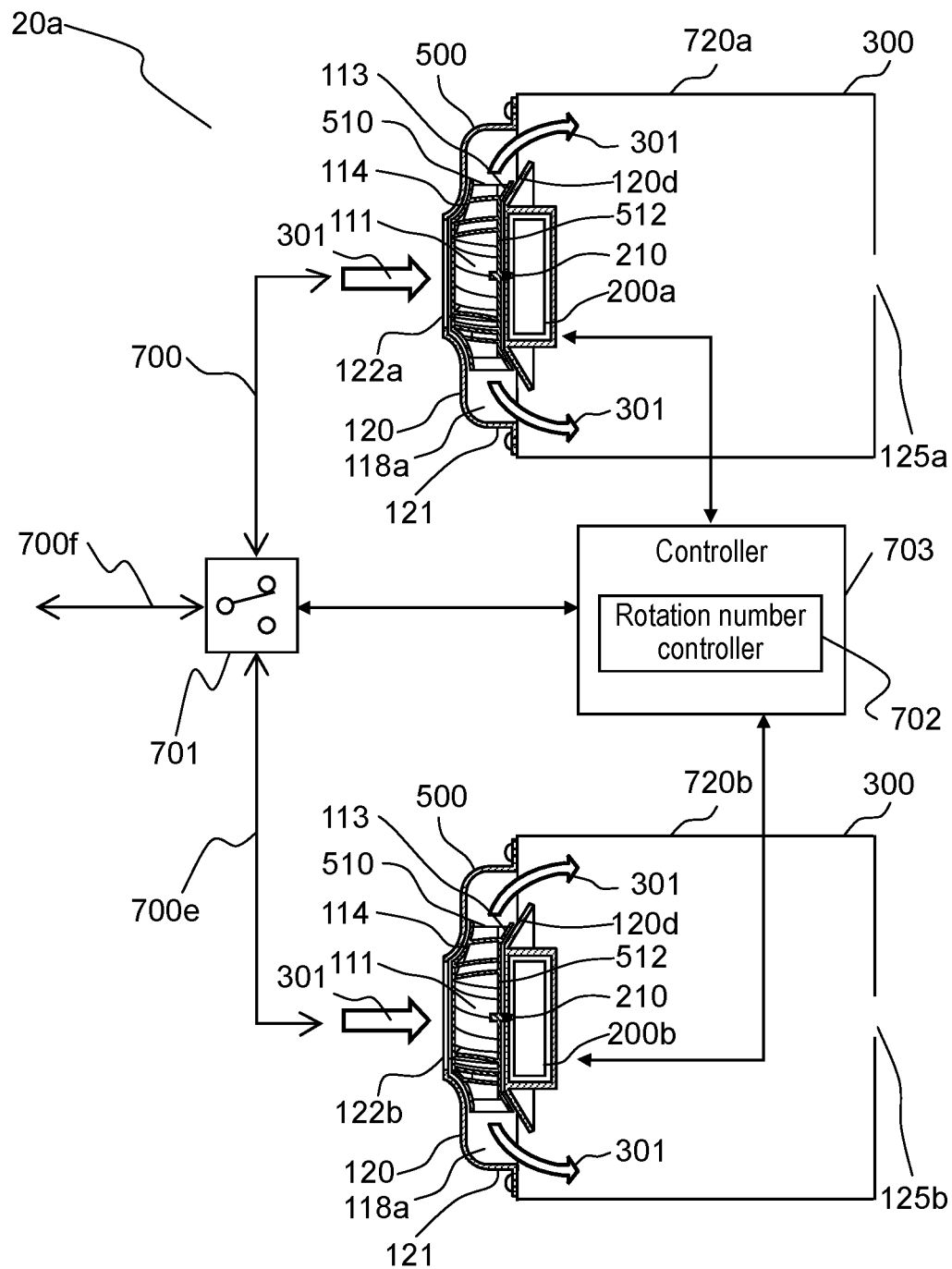
FIG. 17 is a schematic view of a system configuration of another temperature conditioning system according to the fifth embodiment of the present invention.
Figure 18:
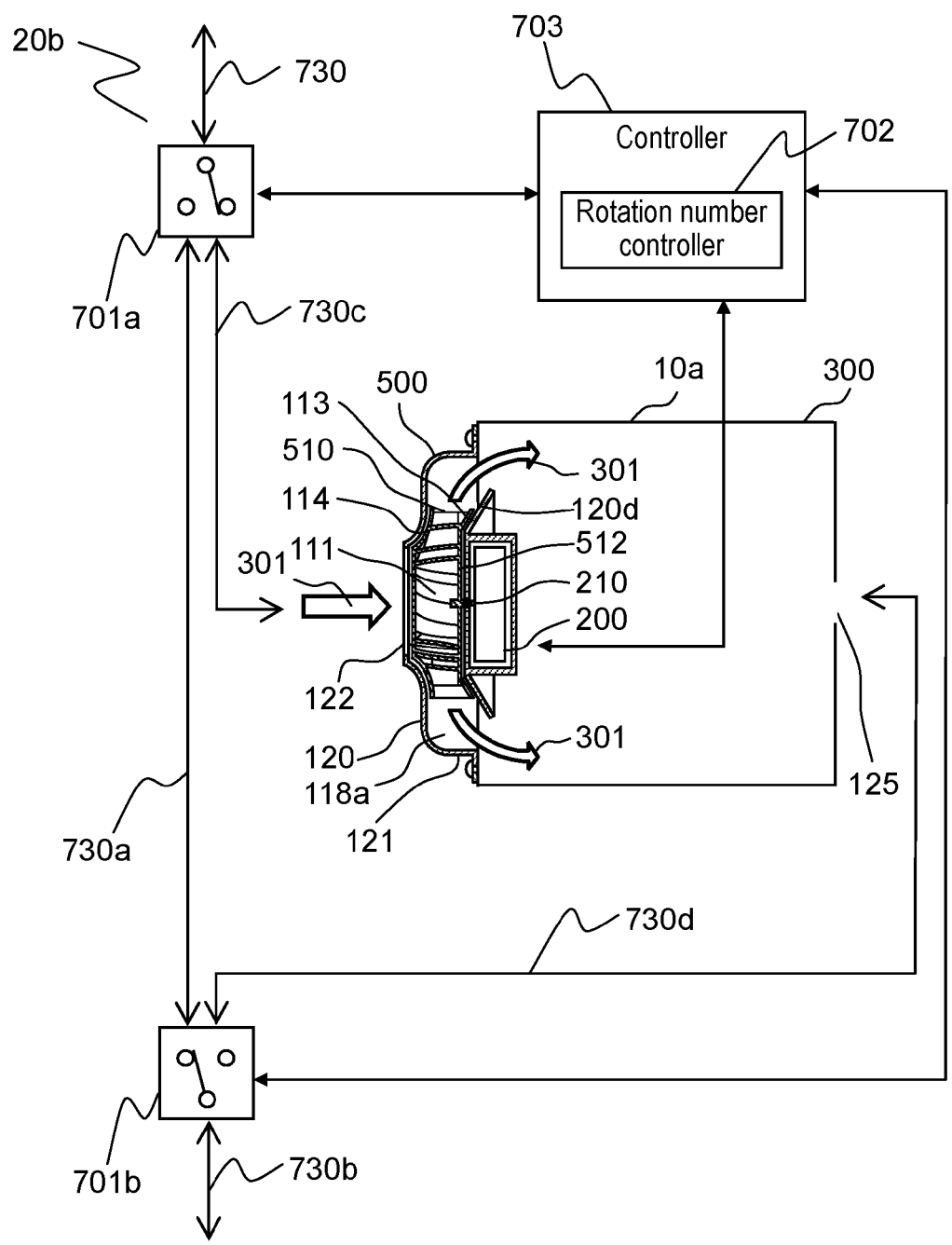
FIG. 18 is a schematic view of a system configuration of further another temperature conditioning system according to the fifth embodiment of the present invention.

FIG. 16 is a schematic view of a system configuration of a temperature conditioning system according to a fifth embodiment of the present invention. FIG. 17 is a schematic view of a system configuration of another temperature conditioning system according to the fifth embodiment of the invention. FIG. 18 is a schematic view of a system configuration of further another temperature conditioning system according to the fifth embodiment of the invention.

Figure 19:
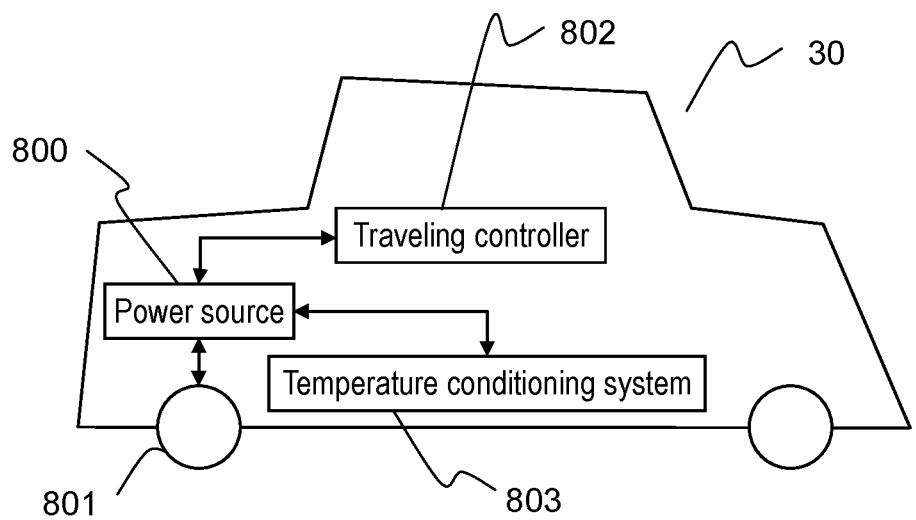
FIG. 19 is a schematic view of a vehicle according to the fifth embodiment of the present invention.
Figure 20:
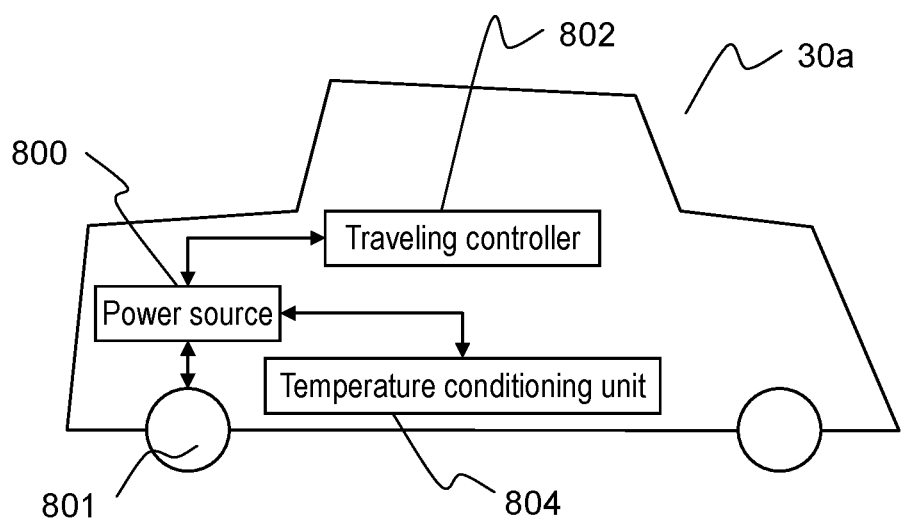
FIG. 20 is a schematic view of another vehicle according to the fifth embodiment of the present invention.

Moreover, FIG. 19 is a schematic view of a vehicle according to the fifth embodiment of the present invention. FIG. 20 is a schematic view of another vehicle according to the fifth embodiment of the invention.

It should be noted that the same constituent elements as those of the temperature conditioning units according to the first to fourth embodiments are designated by the same numerals and symbols, and their descriptions are incorporated herein by reference.

As shown in FIGS. 16 to 18, the temperature conditioning system according to the fifth embodiment of the present invention is configured as follows:

That is, as shown in FIG. 16, temperature conditioning system 20 according to the fifth embodiment of the invention includes: first temperature conditioning unit 711*a*, second temperature conditioning unit 711*b*, a plurality of ducts 700, 700*a*, 700*b*, 700*c*, and 700*d*, changeover switch 701, rotation number controller 702, and controller 703.

First temperature conditioning unit 711*a* and second temperature conditioning unit 711*b* can employ any of the temperature conditioning units described above in the first to fourth embodiments. In FIG. 16, the temperature conditioning units are shown which have been described in the first embodiment with reference to FIG. 2.

Of the plurality of the ducts, ducts 700*b* and 700*c* couple exhaust hole 125*a* included in first temperature conditioning unit 711*a* to suction hole 122*b* included in second temperature conditioning unit 711*b*.

Alternatively, of the plurality of the ducts, ducts 700 and 700*a* couple suction hole 122*a* included in first temperature conditioning unit 711*a* to exhaust hole 125*b* included in second temperature conditioning unit 711*b*.

Changeover switch 701 changes coupling states of the plurality of ducts 700, 700*a*, and 700*d*.

Rotation number controller 702 controls at least one of the rotation number of electric motor 200*a* included in first temperature conditioning unit 711*a* and the rotation number of electric motor 200*b* included in second temperature conditioning unit 711*b*.

Controller 703 controls changeover switch 701 and rotation number controller 702. Controller 703 controls either flow paths or volumes of the air that flows through the plurality of ducts 700, 700*a*, 700*b*, 700*c*, and 700*d*.

Moreover, as shown in FIG. 17, temperature conditioning system 20*a* according to the fifth embodiment of the present invention includes: first temperature conditioning unit 720*a*, second temperature conditioning unit 720*b*, a plurality of ducts 700, 700*e*, and 700*f*, changeover switch 701, rotation number controller 702, and controller 703.

First temperature conditioning unit 720*a* and second temperature conditioning unit 720*b* can employ any ones of the temperature conditioning units described above in the first to fourth embodiments. In FIG. 17, the temperature conditioning units are shown which have been described in the second embodiment with reference to FIG. 6A.

Of the plurality of the ducts, ducts 700 and 700*e* couple suction hole 122*a* included in first temperature conditioning unit 720*a* to suction hole 122*b* included in second temperature conditioning unit 720*b*.

Alternatively, the plurality of the ducts may couple exhaust hole 125*a* included in first temperature conditioning unit 720*a* to exhaust hole 125*b* included in second temperature conditioning unit 720*b*.

Changeover switch 701 changes coupling states of the plurality of ducts 700, 700*e*, and 700*f*.

Rotation number controller 702 controls at least one of the rotation number of electric motor 200*a* included in first temperature conditioning unit 720a and the rotation number of electric motor 200b included in second temperature conditioning unit 720b.

Controller 703 controls changeover switch 701 and rotation number controller 702. Controller 703 controls either flow paths or volumes of the air that flows through the plurality of ducts 700, 700e, and 700f.

Alternatively, as shown in FIG. 18, temperature conditioning system 20b according to the fifth embodiment of the present invention includes: temperature conditioning unit 10a, first ducts 730, 730a, and 730b, second ducts 730c and 730d, changeover switches 701a and 701b, rotation number controller 702, and controller 703.

Temperature conditioning unit 10a can employ any of the temperature conditioning units described above in the first to fourth embodiments. In FIG. 18, the temperature conditioning unit is shown which has been described in the second embodiment with reference to FIG. 6A.

First ducts 730, 730a, and 730b pass air through them without via temperature conditioning unit 10a.

Second duct 730c passes air that is to be supplied to temperature conditioning unit 10a. Second duct 730d passes air that has been discharged from temperature conditioning unit 10a.

Changeover switches 701a and 701b are coupled with first and second ducts 730, 730a, 730b, 730c, and 730d. Changeover switches 701a and 701b change the paths of the airflow.

Rotation number controller 702 controls at least the rotation number of electric motor 200 that temperature conditioning unit 10a includes.

Controller 703 controls changeover switches 701a and 701b and rotation number controller 702. Controller 703 controls either flow paths or volumes of the air that flows through the insides of first and second ducts 730, 730a, 730b, 730c, and 730d.

Moreover, as shown in FIG. 19, vehicle 30 according to the fifth embodiment of the present invention includes: power source 800, driving wheels 801, traveling controller 802, and temperature conditioning system 803.

Driving wheels 801 are driven by power supplied from power source 800. Traveling controller 802 controls power source 800. Temperature conditioning system 803 can employ any of temperature conditioning systems 20, 20a, and 20b described above.

Moreover, as shown in FIG. 20, vehicle 30a according to the fifth embodiment of the present invention includes: power source 800, driving wheels 801, traveling controller 802, and temperature conditioning unit 804.

Driving wheels 801 are driven by power supplied from power source 800. Traveling controller 802 controls power source 800. Temperature conditioning unit 804 can employ any of the temperature conditioning units described above in the first to fourth embodiments.

More details will be described with reference to the drawings.

As shown in FIG. 19, temperature conditioning system 803 according to each of the embodiments of the present invention is mounted on vehicle 30. In cases of temperature conditioning system 803 being mounted on vehicle 30, the following configuration allows effective cooling and warming of members to be temperature-conditioned.

That is, temperature conditioning system 803 according to the fifth embodiment can employ a plurality of the temperature conditioning units according to any of the embodiments of the present invention. Temperature conditioning system 803 includes a plurality of ducts which couple between the suction and vent holes included in the temperature conditioning units. Temperature conditioning system 803 includes a changeover switch that changes volumes of the air flowing through the ducts and flow paths passing the air though them.

For example, in cases where air temperature on the suction side is lower than ordinary temperatures, the plurality of the temperature conditioning units is coupled with each other via the ducts. This configuration allows efficient temperature control of the members to be conditioned.

Moreover, temperature conditioning system 803 according to the fifth embodiment includes a plurality of ducts that are coupled with the suction and vent holes of the temperature conditioning units. The temperature conditioning system includes a changeover switch that changes volumes of the air flowing through the ducts and flow paths passing the air though them.

For example, the suction and vent holes included in the temperature conditioning units according to the embodiment are coupled with the plurality of the ducts.

One end of a duct of the ducts is coupled with the outside of the vehicle, while the other end is coupled with the changeover switch. One end of a duct of the ducts is coupled with the changeover switch, while the other end is coupled with the changeover switch. Moreover, one end of a duct of the ducts is coupled with the changeover switch, while the other end is coupled with the suction hole included in the temperature conditioning unit. One end of a duct of the ducts is coupled with the exhaust hole included in the temperature conditioning unit, while the other end is coupled with the changeover switch.

In the configuration, when the temperature of air outside of vehicle 30 is within a predetermined range, the outside air can be directly taken into the cabin of vehicle 30 via the duct. Moreover, when the temperature of the air outside of vehicle 30 is out of the predetermined range, the outside air can be taken into the cabin of vehicle 30 via the duct and the temperature conditioning unit.

That is, the temperature conditioning system according to the fifth embodiment is capable of changing the air that is supplied to members to be temperature-controlled, in accordance with the temperature of the air outside of the vehicle. Therefore, the temperature conditioning system according to the fifth embodiment can efficiently perform the temperature conditioning of the members to be controlled, while saving energy.

Note that, in the temperature conditioning system described above, the threshold values, at which the ducts will be switched, of the temperature of the air outside of the vehicle may be appropriately set depending on a purpose. Moreover, in the temperature conditioning system described above, the switchover between the ducts for appropriately taking in the air from the outside of the vehicle may be carried out in accordance with atmospheric pressure instead of the temperature of the air outside of the vehicle.

Moreover, the mode shown in FIG. 20 can be described by using the description of the mode shown in FIG. 19, the entire contents of which are incorporated herein by reference, with the exception that the words "temperature conditioning system 803" in the description are read as "temperature conditioning unit 804."

INDUSTRIAL APPLICABILITY

The temperature conditioning units, temperature conditioning systems, and vehicles equipped with the units or systems according to the present invention, are capable of performing temperature conditioning of batteries that are mounted in the vehicles, while achieving their reduced size, increased power output, and improved efficiency.

Moreover, the temperature conditioning units, temperature conditioning systems, and vehicles equipped with the units or systems, according to the present invention, do not cause excessive vibrations and noise, in conditioning the temperature of members to be temperature-conditioned.

The invention claimed is:
1. A temperature conditioning unit, comprising:
an impeller including:
an impeller disk including:
a rotary shaft at a center portion of the impeller disk; and
a surface extending in a direction intersecting the rotary shaft; and
a plurality of rotor blades extending in a direction along the rotary shaft, each of the rotor blades having a cross-sectional circular-arc shape in the direction intersecting the rotary shaft, the shape being a convex form curving toward a direction of rotation of the impeller disk, each of the rotor blades including:
an inner-periphery-side edge located on the-rotary-shaft side; and
an outer-periphery-side edge located on an opposite rotary-shaft side; an electric motor including
a shaft for transferring a rotary motion to the rotary shaft;
a fan case covering the impeller and including:
a side wall disposed along the rotary shaft;
a suction hole located in a direction of a shaft center of the rotary shaft;
a discharge hole located in the direction along the rotary shaft, on an opposite side of the suction hole with respect to the side wall; and
a flow path for conducting air along the side wall to the discharge hole when the impeller is rotated by the rotary motion transferred from the motor, the air having been suctioned from the suction hole and passed from the inner-periphery-side edge through the outer-periphery-side edge to the flow path; and
a housing including
an external surface on which the fan case is mounted, the housing accommodating a member to be temperature-conditioned in an inside of the housing,
wherein the housing further includes an exhaust hole for exhausting the air to an outside of the housing, the air having been introduced into the housing, and
the exhaust hole faces the suction hole of the fan case.
2. The temperature conditioning unit according to claim 1, wherein the fan case further includes an inner wall surface configuring a part of the flow path and facing the impeller; and
the inner wall surface includes a curved part curving such that an extension line intersects the shaft center at an acute angle in a plane including the shaft center, the extension line extending from a straight line connecting two points of the fan case, one of the two being close to the outer-periphery-side edge and the other being at an edge of the discharge hole.
3. The temperature conditioning unit according to claim 1, wherein the flow path includes a guide surface disposed to face the inner wall surface; and
the guide surface includes an inclined part inclined toward the direction of the shaft center, the inclined part being disposed between the discharge hole and a portion, of the guide surface, in close proximity to the outer-periphery-side edge.
4. The temperature conditioning unit according to claim 1, wherein the impeller disk includes a guide part in an outer periphery part of the impeller disk, the guide part being inclined toward a position of the discharge hole.
5. The temperature conditioning unit according to claim 1, wherein the impeller further includes a shroud disposed on an opposite side of the impeller disk with respect to the plurality of the rotor blades, the shroud being coupled with an opposite impeller-disk-side edge of each of the plurality of the rotor blades;
the shroud includes an opening at a position facing the suction hole; and
a distance between the shroud and the impeller disk is shorter on the-outer-periphery-side-edge side than on the-inner-periphery-side-edge side, in the direction along the rotary shaft.
6. The temperature conditioning unit according to claim 1, wherein, in each of the plurality of the rotor blades, the inner-periphery-side edge is located in front of the outer-periphery-side edge, in a direction of rotation of the impeller.
7. The temperature conditioning unit according to claim 1, wherein the fan case is mounted to the housing; and
the housing further includes a regulating plate disposed in the housing at a portion facing the discharge hole, for regulating a flow of the air having been discharged from the flow path via the discharge hole.
8. The temperature conditioning unit according to claim 1, wherein the impeller further includes a plurality of stator blades protruding forward in a direction of rotation of the impeller, from positions at an outer periphery of the impeller disk.
9. The temperature conditioning unit according to claim 8, wherein the temperature conditioning unit satisfies a relation

$$Zd \ne n \times F$$

where "Zd" is a number of the plurality of the stator blades, "F" is a divisor of "Zf" that is a number of the plurality of the rotor blades, and "n" is a natural number.
10. The temperature conditioning unit according to claim 8, wherein the temperature conditioning unit satisfies relations $$m \times Zf \ne n \times P,$$

$$m \times Zf \ne n \times S, \text{ and}$$

$$Zf \ne n \times D$$

where "Zf" is a number of the plurality of the rotor blades, "Zd" is a number of the plurality of the stator blades, "m" and "n" are each a natural number, "P" is a number of poles included in the electric motor, "S" is a number of slots included in the electric motor, "C" is a least common multiple of the number "P" of the poles and the number "S" of the slots, and "D" is a divisor of the least common multiple "C."
11. The temperature conditioning unit according to claim 8, wherein the temperature conditioning unit satisfies relations $$m \times Zf \ne n \times P,$$

$$m \times zf \ne n \times S,$$

$Zf \neq n \times D$, and $Zd \neq n \times F$ where "Zf" is a number of the plurality of the rotor blades, "Zd" is a number of the plurality of the stator blades, "F" is a divisor of the number "Zf," "m" and "n" are each a natural number, "P" is a number of poles included in the electric motor, "S" is a number of slots included in the electric motor, "C" is a least common multiple of the number "P" of the poles and the number "S" of the slots, and "D" is a divisor of the least common multiple "C."

12. The temperature conditioning unit according to claim 1,
wherein the impeller further includes a diffuser including:
a diffuser plate disposed in parallel with the impeller disk; and
a plurality of stator blades;
the plurality of the stator blades extends in the direction along the rotary shaft, from a surface, on the-suction-hole side, of the diffuser plate; and
the plurality of the stator blades protrudes forward in a direction of rotation of the impeller, from positions at an outer periphery of the impeller disk.

13. The temperature conditioning unit according to claim 12, wherein the temperature conditioning unit satisfies a relation $Zd \neq n \times F$ where "Zd" is a number of the plurality of the stator blades, "F" is a divisor of "Zf" that is a number of the plurality of the rotor blades, and "n" is a natural number.

14. The temperature conditioning unit according to claim 12, wherein the temperature conditioning unit satisfies relations $m \times Zf \neq n \times P$, $m \times Zf \neq n \times S$, and $Zf \neq n \times D$ where "Zf" is a number of the plurality of the rotor blades, "Zd" is a number of the plurality of the stator blades, "m" and "n" are each a natural number, "P" is a number of poles included in the electric motor, "S" is a number of slots included in the electric motor, "C" is a least common multiple of the number "P" of the poles and the number "S" of the slots, and "D" is a divisor of the least common multiple "C."

15. The temperature conditioning unit according to claim 12, wherein the temperature conditioning unit satisfies relations $m \times Zf \neq n \times P$, i $m \times Zf \neq n \times S$, $Zf \neq n \times D$, and $Zd \neq n \times F$ where "Zf" is a number of the plurality of the rotor blades, "Zd" is a number of the plurality of the stator blades, "F" is a divisor of the number "Zf," "m" and "n" are each a natural number, "P" is a number of poles included in the electric motor, "S" is a number of slots included in the electric motor, "C" is a least common multiple of the number "P" of the poles and the number "S" of the slots, and "D" is a divisor of the least common multiple "C."

16. The temperature conditioning unit according to claim 1, wherein, the member to be temperature-conditioned is one of a secondary battery, an automotive secondary battery, an electric-power conversion apparatus, and an automotive electric-power conversion apparatus.

17. A temperature conditioning system, comprising:
a first temperature conditioning unit according to claim 1;
a second temperature conditioning unit according to claim 1;
a plurality of ducts for coupling either the exhaust or the suction hole included in the first temperature conditioning unit to either the suction or the exhaust hole included in the second temperature conditioning unit;
a changeover switch for switching between coupling states of the plurality of the ducts;
a rotation number controller for controlling at least one of a rotation number of the electric motor included in the first temperature conditioning unit and a rotation number of the electric motor included in the second temperature conditioning unit; and
a controller for controlling the changeover switch and the rotation number controller, for controlling one of a path of air flowing inside the plurality of the ducts and a volume of the air.

18. A temperature conditioning system, comprising:
the temperature conditioning unit according to claim 1;
a first duct for passing air therethrough without via the temperature conditioning unit;
a second duct for passing the air therethrough, the air being either supplied to the temperature conditioning unit or discharged from the temperature conditioning unit;
a changeover switch coupled with the first duct and the second duct, for switching between flows of the air;
a rotation number controller for controlling at least a rotation number of the electric motor included in the temperature conditioning unit; and
a controller for controlling the changeover switch and the rotation number controller, for controlling one of a path of the air flowing inside the plurality of the ducts and a volume of the air.

19. A vehicle comprising:
a power source;
driving wheels driven by power supplied from the power source;
a traveling controller for controlling the power source; and
a temperature conditioning unit according to claim 1.

* * * * *